United States Patent
Chapman

[19]

[11] Patent Number: 6,135,465
[45] Date of Patent: Oct. 24, 2000

[54] CAMERA DOLLY

[75] Inventor: Leonard T. Chapman, North Hollywood, Calif.

[73] Assignee: Chapman/Leonard Studio Equipment, North Hollywood, Calif.

[21] Appl. No.: 09/055,012

[22] Filed: Apr. 3, 1998

[51] Int. Cl.[7] .................................................. B62B 3/02
[52] U.S. Cl. ........................ 280/47.11; 280/98; 280/99; 280/103
[58] Field of Search .................................. 280/47.11, 98, 280/99, 103

[56] References Cited

U.S. PATENT DOCUMENTS

| | | | |
|---|---|---|---|
| 2,228,247 | 1/1941 | Cunningham | 280/47.11 |
| 2,470,496 | 5/1949 | Krilanovich | 180/410 |
| 2,715,534 | 8/1955 | Hoge | 280/47.11 |
| 2,756,066 | 7/1956 | Ludowici . | |
| 2,834,605 | 5/1958 | McCollough | 180/410 |
| 2,842,376 | 7/1958 | Krilanovich . | |
| 2,901,265 | 8/1959 | Knight et al. | 280/91.1 |
| 2,915,319 | 12/1959 | Kumler | 180/410 |
| 2,995,380 | 8/1961 | King | 180/409 |
| 3,018,116 | 1/1962 | Summers et al. . | |
| 3,126,208 | 3/1964 | De Voghel | 280/47.11 |
| 3,134,455 | 5/1964 | Fiorentini . | |
| 3,189,366 | 6/1965 | Ulinski | 280/93 |
| 4,003,584 | 1/1977 | Zelli | 280/81.5 |
| 4,248,444 | 2/1981 | Johnson . | |
| 4,257,619 | 3/1981 | Fisher . | |
| 4,335,626 | 6/1982 | Fisher . | |
| 4,950,126 | 8/1990 | Fabiano et al. | 414/590 |
| 5,174,593 | 12/1992 | Chapman | 280/47.11 |
| 5,375,863 | 12/1994 | Chapman | 280/99 |
| 5,730,450 | 3/1998 | Chapman | 280/47.11 |

FOREIGN PATENT DOCUMENTS 2 263 889  8/1993  United Kingdom .

OTHER PUBLICATIONS

Drawing Design—"Peewee/Hybrid Dolly Transmission".
Drawing Design—"Peewee Transmission".
Drawing design for PeeWee/Hybrid Dolly Transmission.

Primary Examiner—Brian L. Johnson
Assistant Examiner—Deanna Draper
Attorney, Agent, or Firm—Lyon & Lyon LLP

[57] ABSTRACT

A camera dolly has a steering unit which provides conventional, crab, and round steering modes, selected by the operator via use of a single steering/shifting handle. The steering unit includes first and second transmissions and a differential. Chains link sprockets on the transmissions and differential, to steer the wheels of the camera dolly to appropriate angles, so that the dolly can roll easily and without wheel scrubbing. A dolly leg position compensator adjusts the amount of steering angle correction provided by the differential, to compensate for changes in the dolly wheelbase/tread dimensions. Sprockets in the differential are locked into offset positions, during conventional and round steering, to maintain proper steering angle correction, even under heavy loads. Active idlers are mechanically linked within the steering unit to automatically maintain appropriate chain tension, in all steering modes.

17 Claims, 34 Drawing Sheets

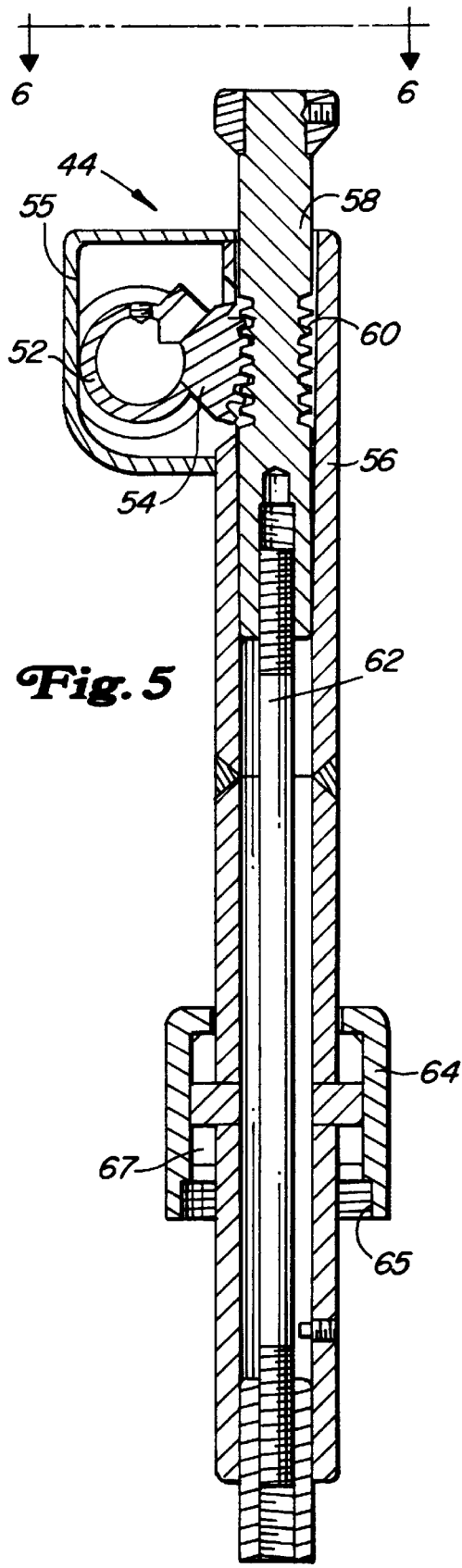
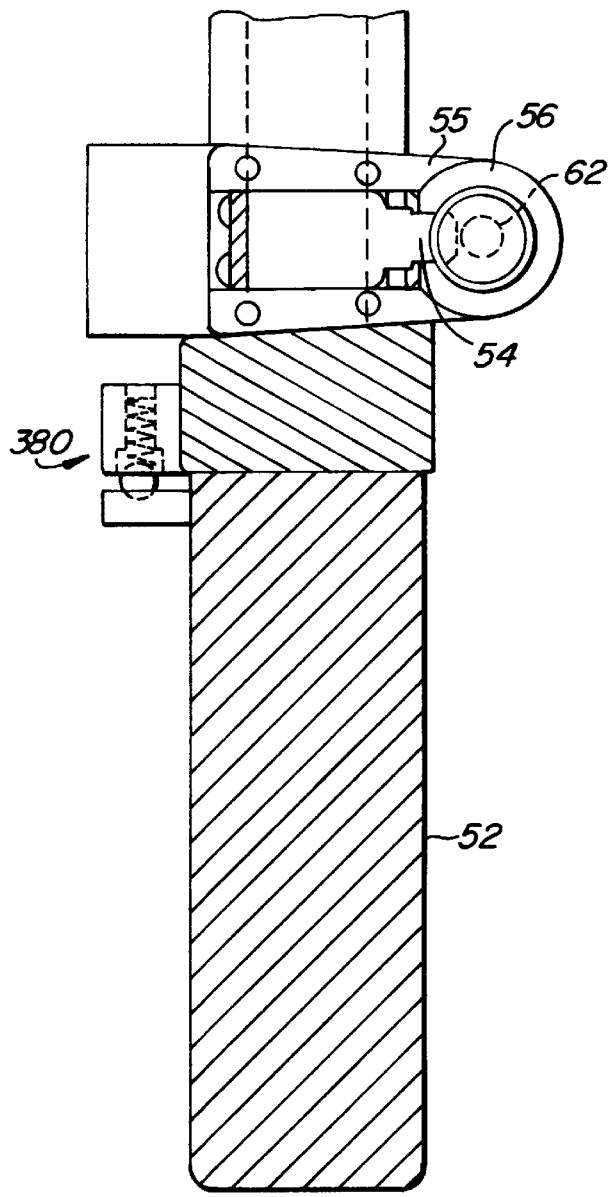
Fig. 5
Fig. 6

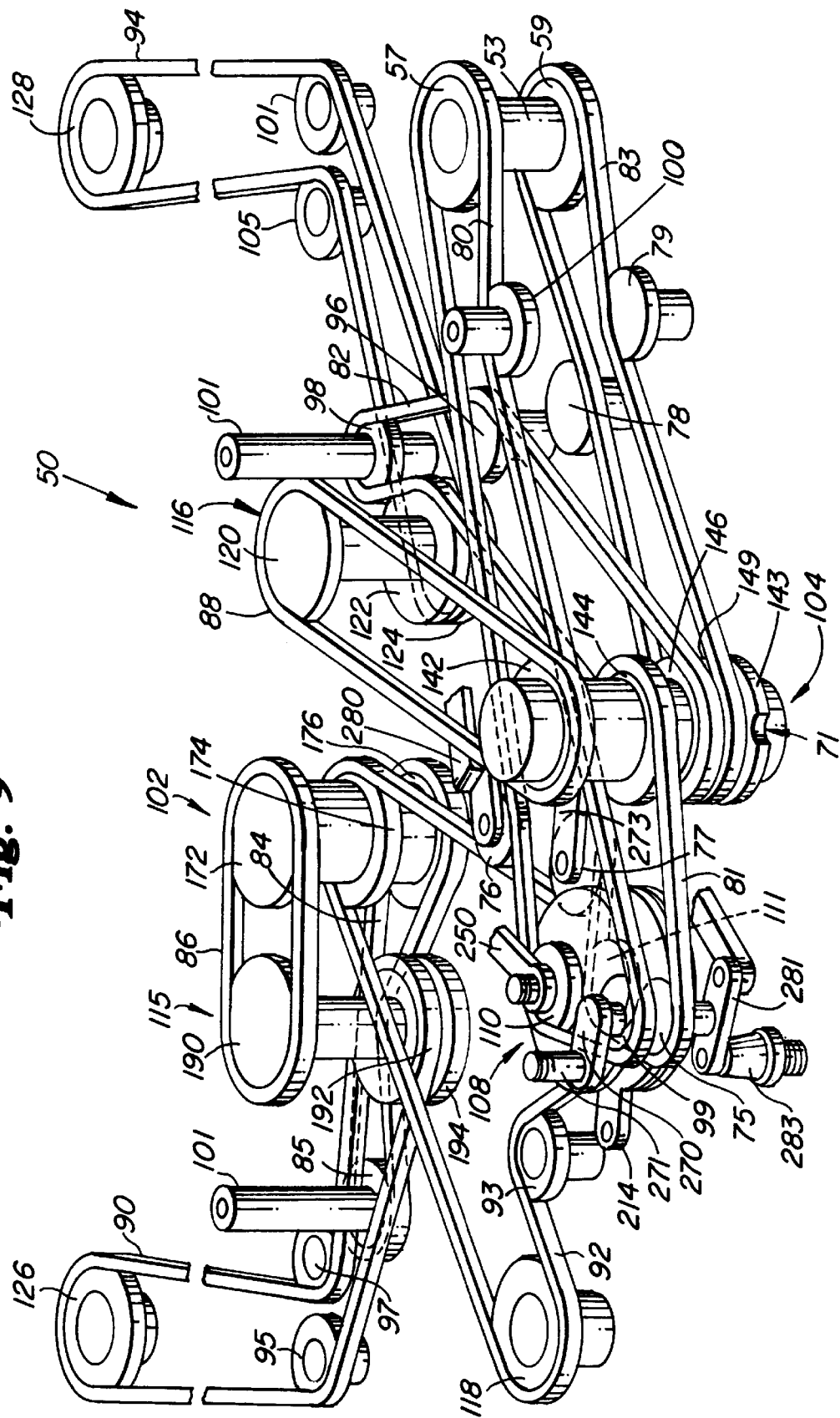

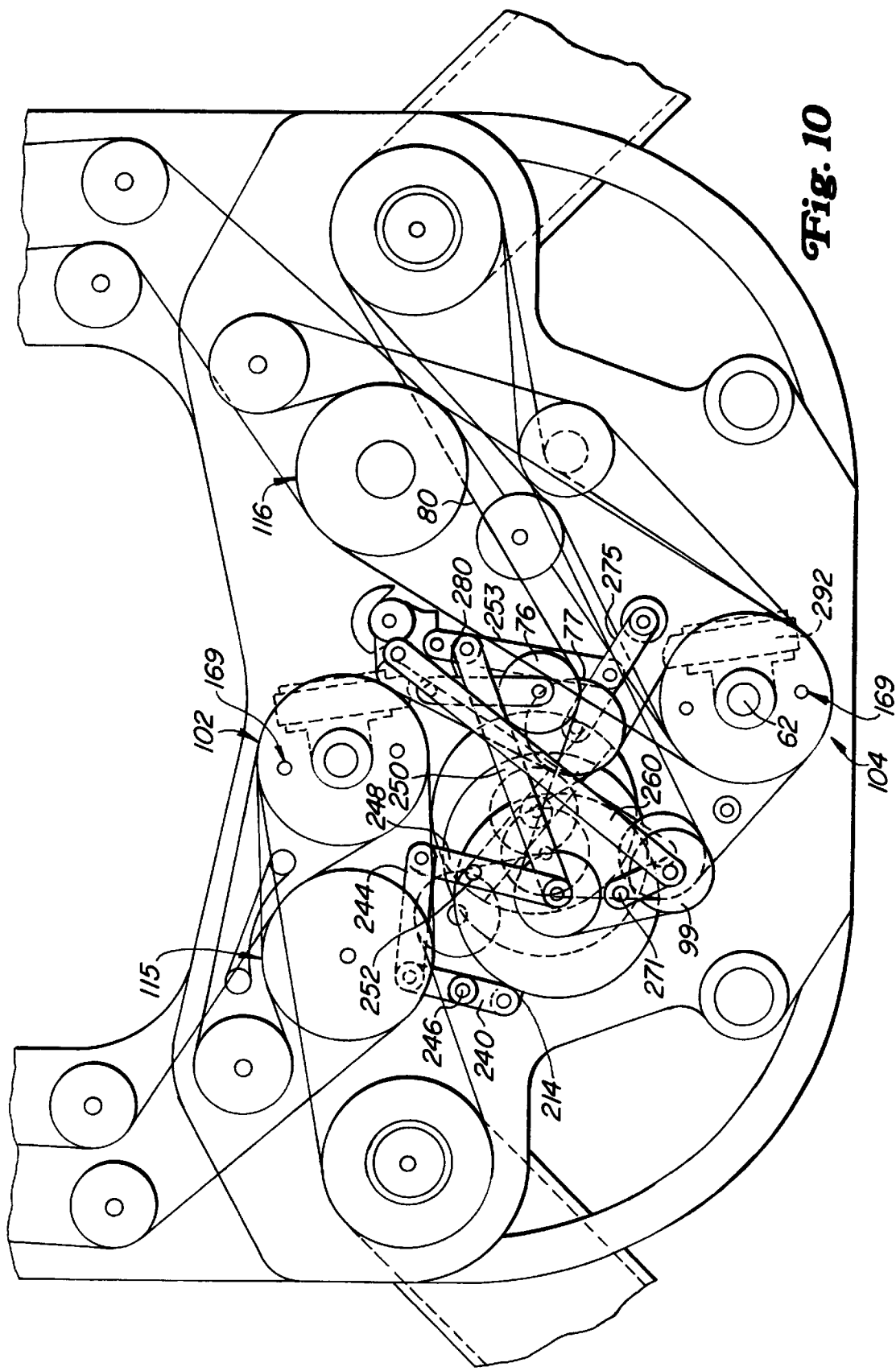

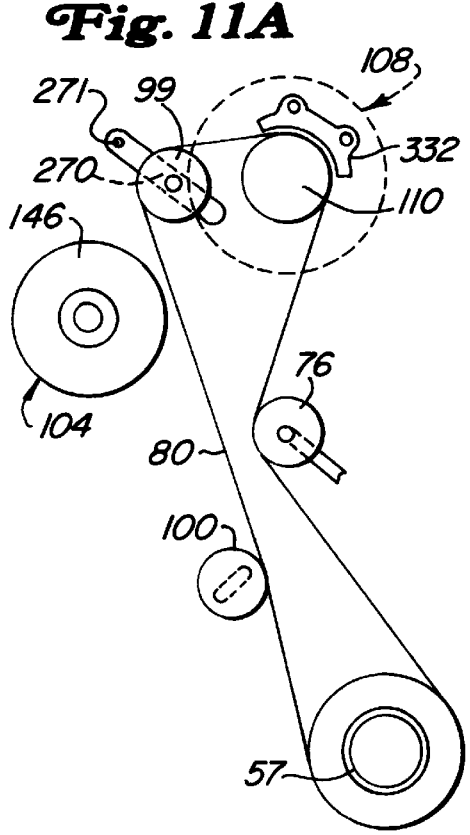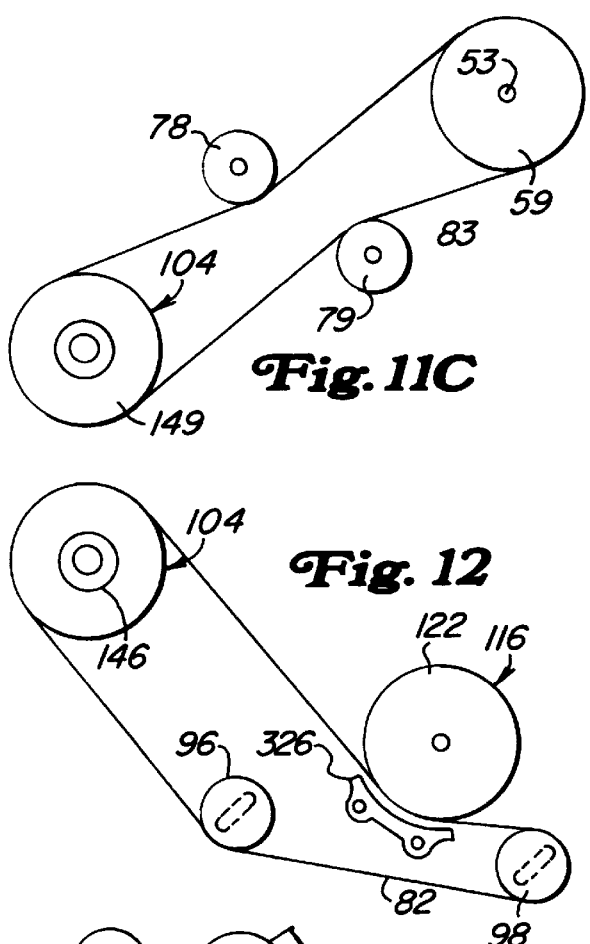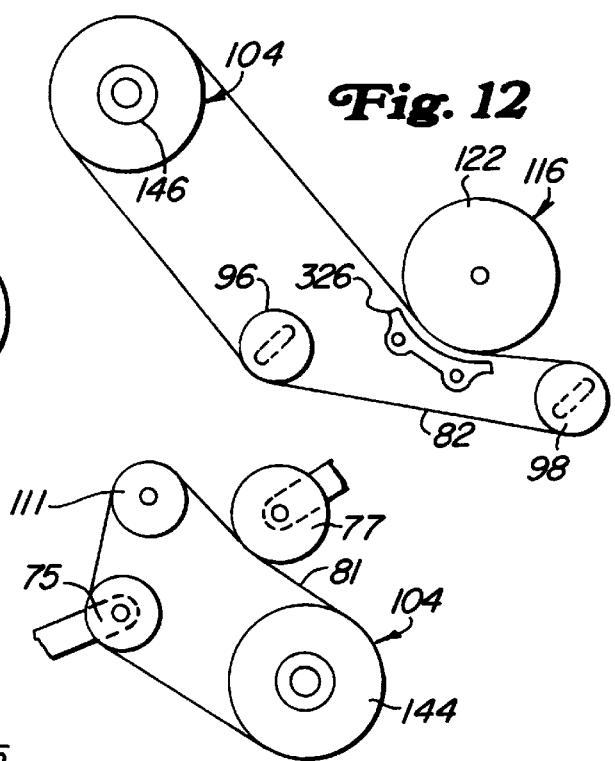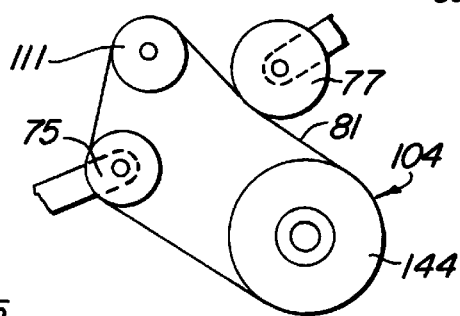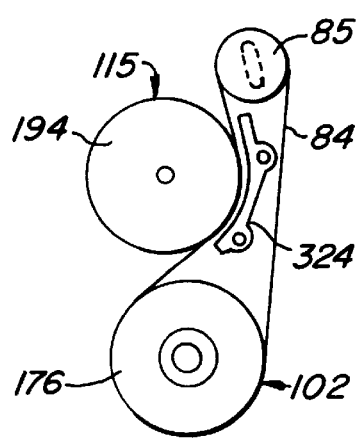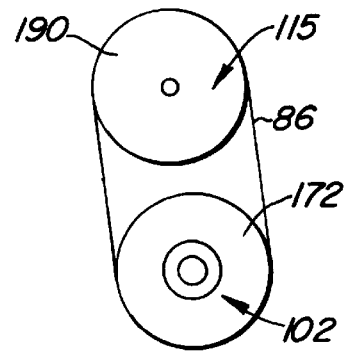

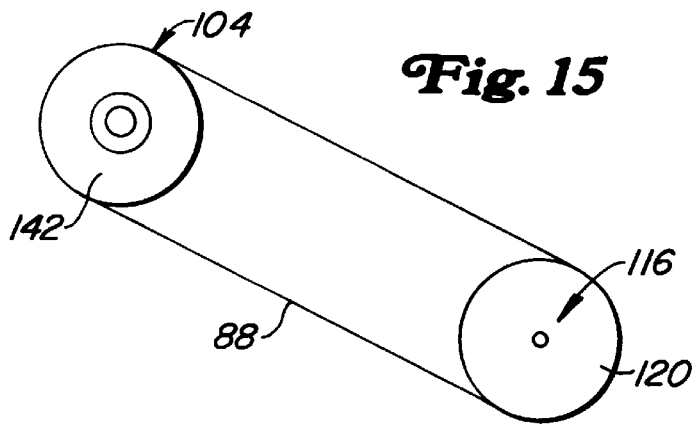
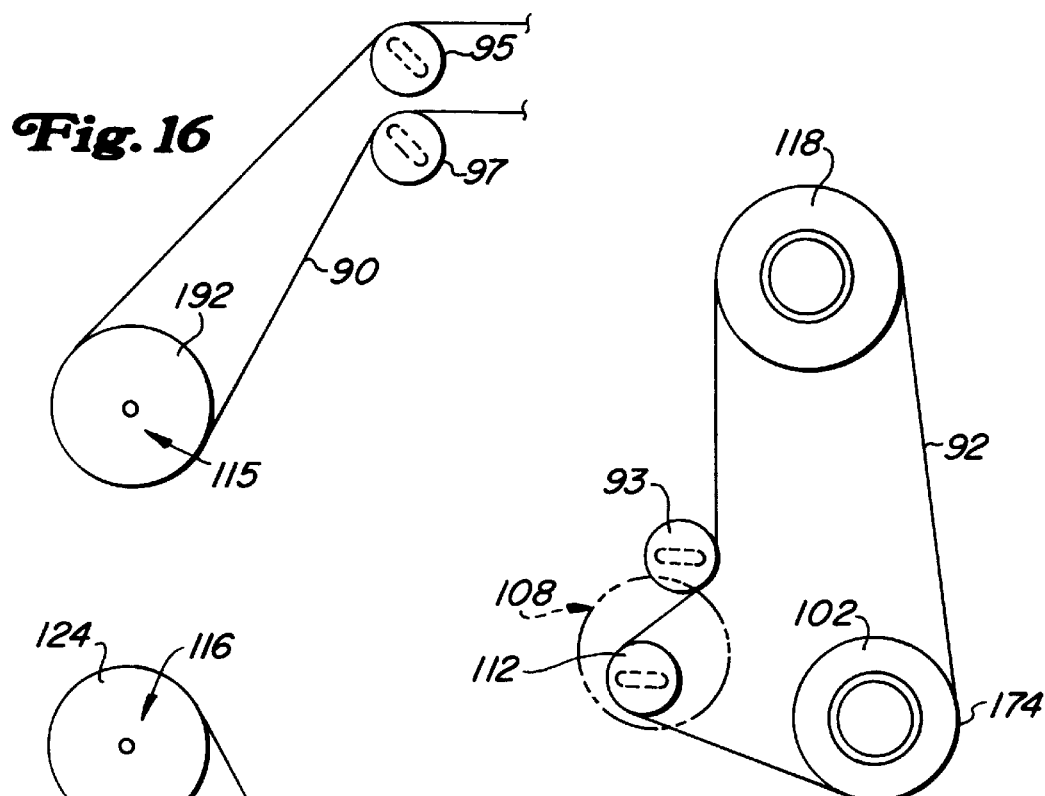
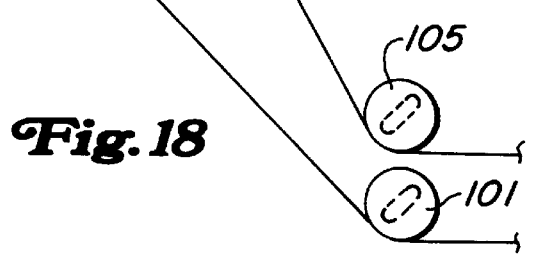

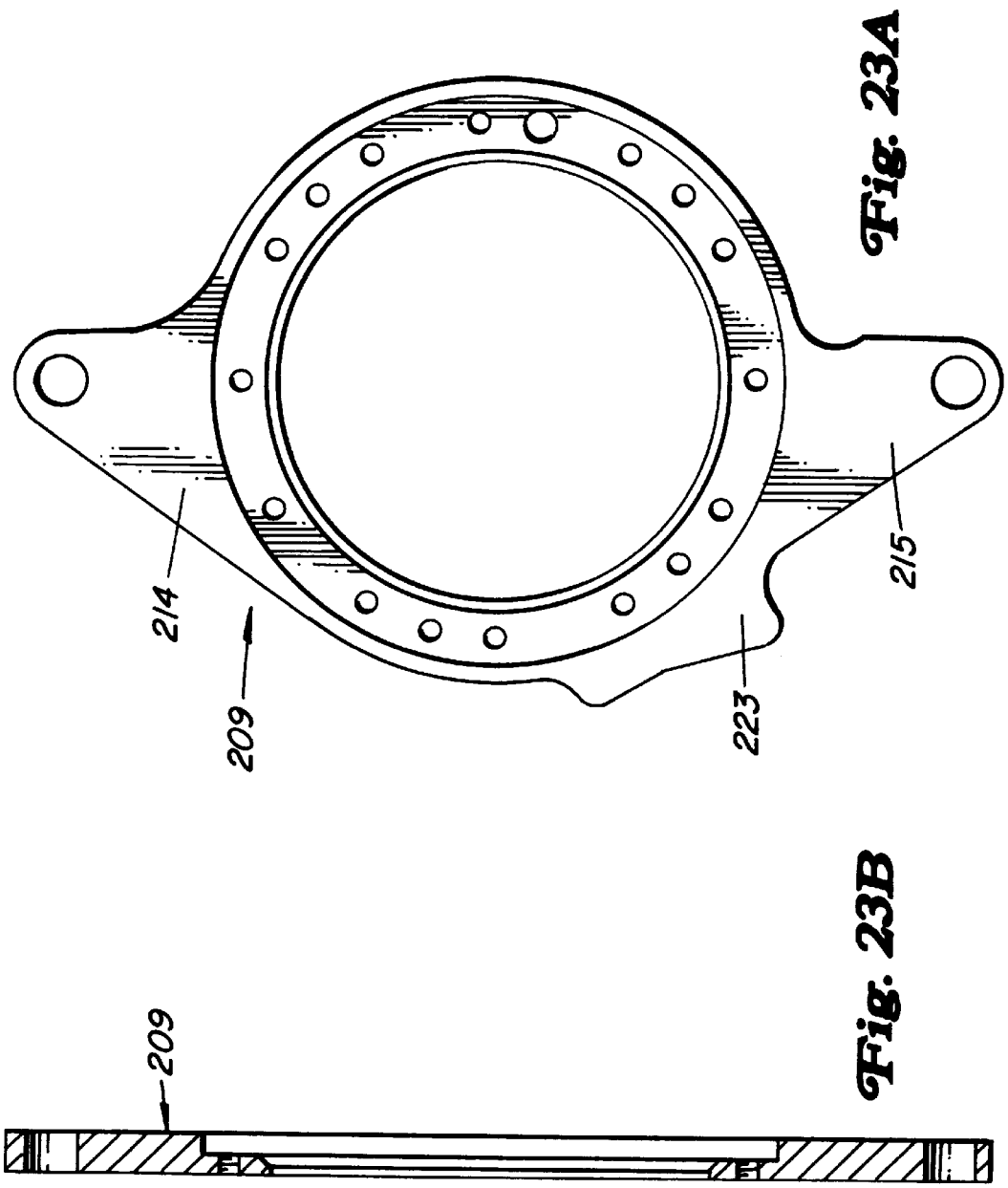

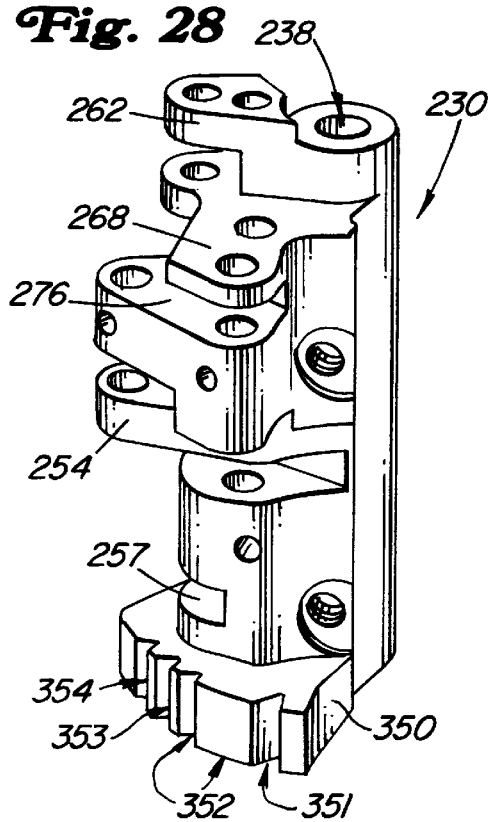
Fig. 28
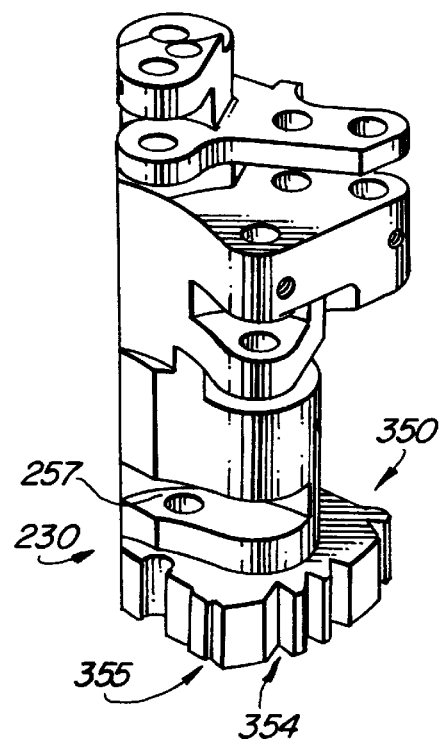
Fig. 29
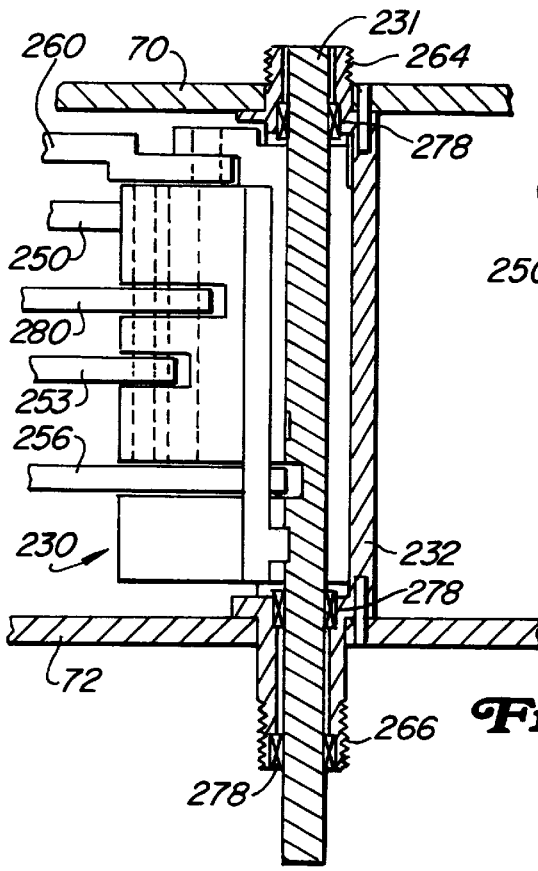
Fig. 31
Fig. 30

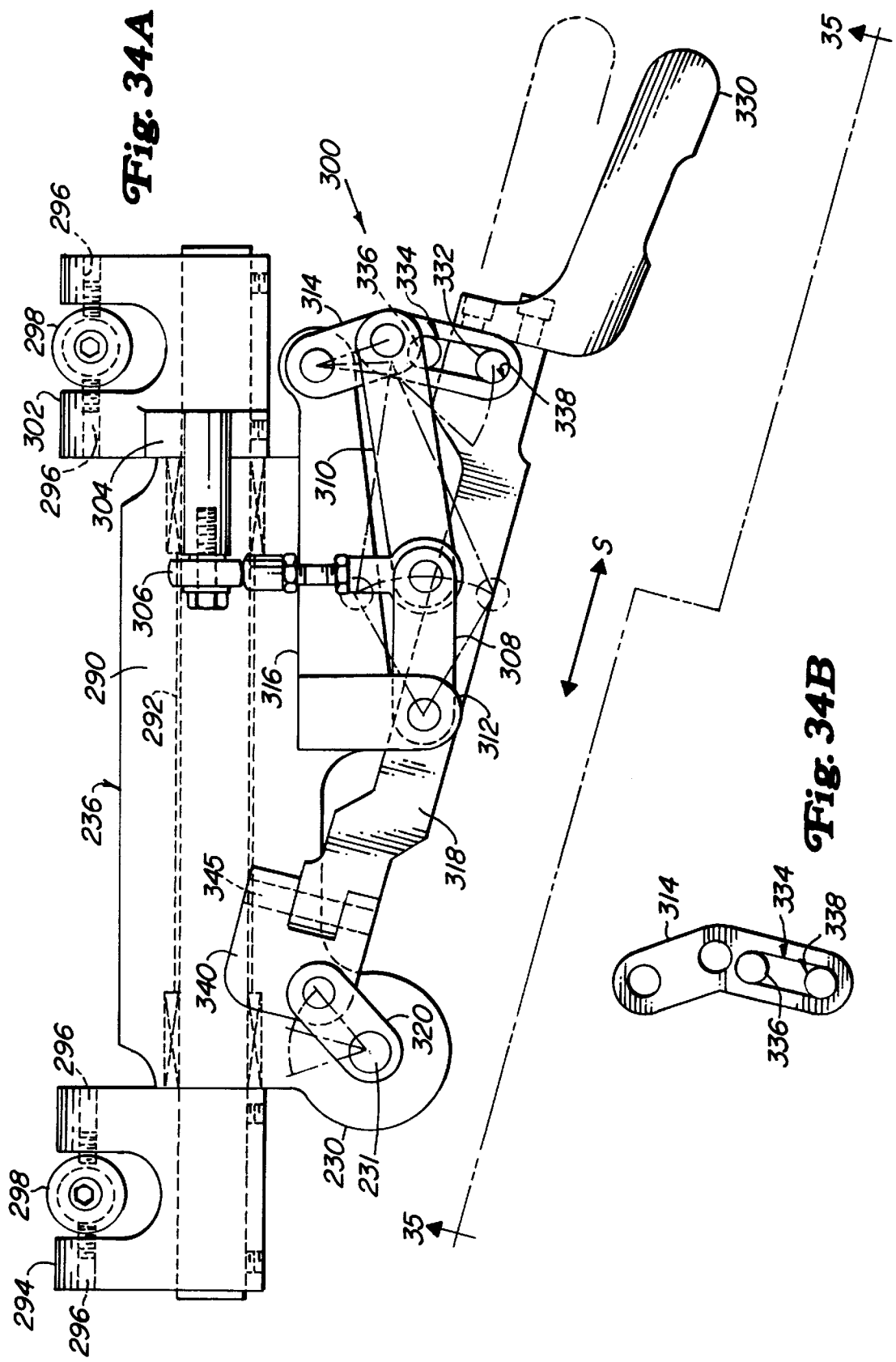

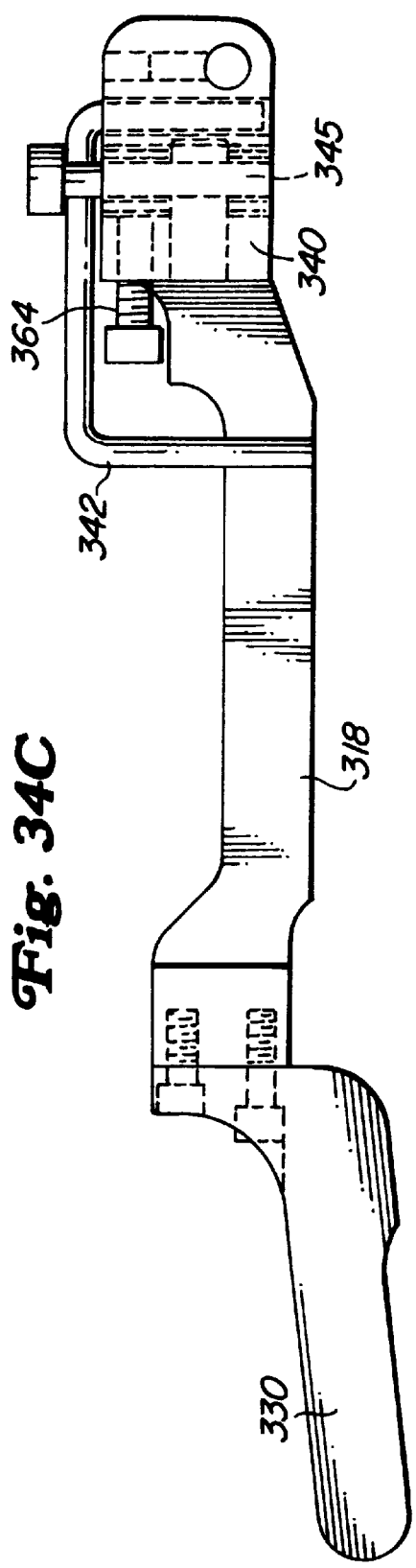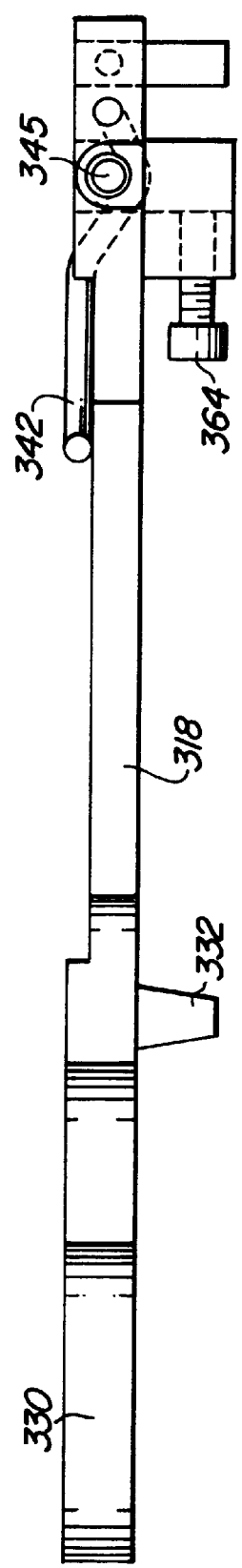
Fig. 34C
Fig. 34D

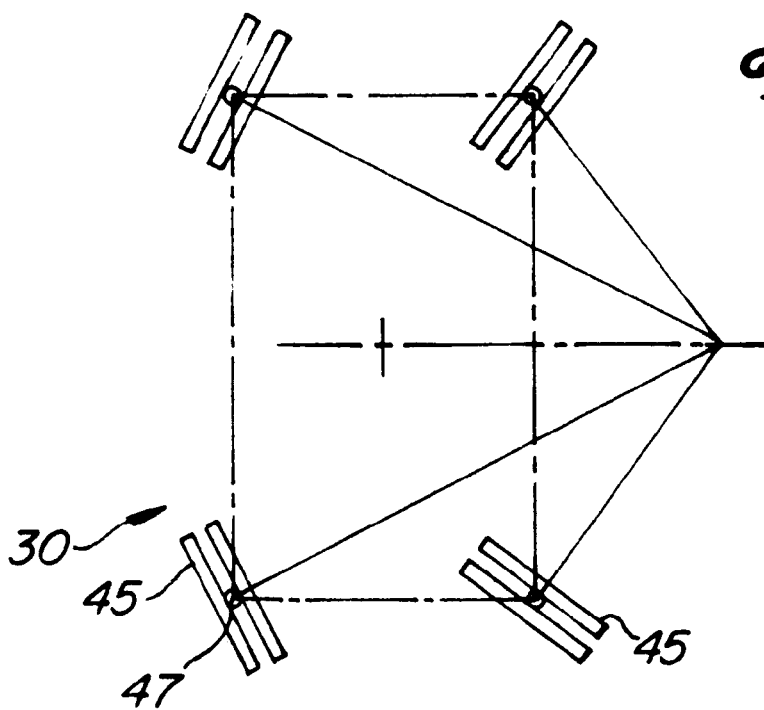

CAMERA DOLLY

BACKGROUND OF THE INVENTION

The field of the invention is camera dollies and camera pedestals.

In the production of motion pictures, the motion picture camera must often be moved from one position to another. The camera movements may require a change in camera position, camera angle, or camera elevation. The camera movement must be performed smoothly, as even small amounts of vibration of the camera can result in unsatisfactory filming, due to shaky or erratic recorded images. For certain film sequences, the camera must be held in a fixed position. In other film sequences, the camera must be continuously and rapidly moved to follow an action or moving sequence. Similar requirements must often be met when using television cameras.

Camera dollies and pedestals have long been used to support and move motion picture cameras. Typically, a camera dolly has four wheels or pairs of wheels on a chassis having a generally rectangular wheel base. The wheels may be attached to the chassis via articulated legs, or the wheels may be directly pivotably attached to the chassis.

The camera dolly is pushed over the floor by dolly operators. During filming on sand, grass, or other uneven surfaces, the dolly may be placed on rails or tracks to provide an even and smooth rolling surface. The dolly wheels may be adapted for both ground and track operation, or separate ground and track wheels may be supplied as accessories, to be installed on the dolly as needed. Larger camera dollies may be self-propelled using electric motors and on-board batteries. Camera pedestals provide similar functions and are used primarily in television studios.

Most camera dollies and pedestals are provided with an arm or telescoping column, to raise and lower the camera. The arm maybe a beam arm, or a hinged holding arm. The arm or column is driven hydraulically, pneumatically or electrically. Various accessories, such as pan heads, tilt heads, risers, extensions, remote control camera heads, etc. may be used to move and position the camera as needed. Seats are often attached to camera dollies to accommodate the cameraman. Push bars and handles may be installed to make it easier to push or carry a camera dolly.

Many camera dollies have steering systems which steer the wheels of the dolly, similar to an automobile. A steering bar or handle at the back end of the dolly is turned by the dolly operator to steer the dolly wheels, typically using a series of chains or belts and sprockets contained within the dolly chassis. The camera is normally mounted towards the front end of the dolly.

For added versatility, the camera dolly should be capable of both "conventional" steering and "crab" steering. Conventional or corrective steering refers to a steering mode where the front wheels of the dolly are locked in to a straight ahead position, while the rear wheels of the dolly are controlled by the steering system and are steered at corrected or adjusted steering angles (or vice versa). This mode may also be referred to as 2-wheel corrective steering. As the dolly turns and travels along a curved path, the inside wheel travels on a radius less than that of the outside wheel, as the outside wheel is spaced apart further from the center of the curved path than the inside wheel. As a result, for proper steering, the inside wheel must turn more sharply than the outside wheel.

A similar requirement is found in automobiles, which have steering linkages which attempt to provide corrective steering. However, in automobiles, the corrective steering is not precise. As a result, when automobiles make sharp turns, the tires may scrub somewhat over the payment. The scrubbing generates the screeching or skidding sounds often heard as an automobile makes a sharp turn, even at a low speed. The scrubbing results because each front wheel is not precisely turned to the correct steering angle needed for the automobile to travel on the curved path. However, in automobiles, this small amount of tire scrubbing during sharp turns is acceptable.

In contrast to automobiles, scrubbing and screeching tires are entirely unacceptable for camera dollies. Camera dolly operation must be silent to avoid interfering with the soundtrack of the motion picture or television production, where even an intermittent or relatively low level of equipment noise will be disruptive and unacceptable. Tire scrubbing also makes a camera dolly more difficult to push, due to increased rolling friction. Many camera dollies accordingly have included steering angle correctors or transmissions, for example, as described in U.S. Pat. Nos. 4,003,584, or 5,174,593.

In these camera dollies, more precise steering angle correction is provided for the conventional steering mode, using cams, moving offset plates, or other mechanical devices intended to achieve correct geometrical steering. That is, these types of steering angle correctors cause the rear wheels of the dolly to more closely track the perfect geometric steering pattern defined by the specific tread width and wheel base of the dolly and a specific turning radius. The front wheels, which are locked into the straight ahead position, do not participate in steering (in the conventional steering mode) and do not need any steering angle correction (similar to the rear wheels of an automobile). The conventional steering mode is often used to simply relocate or position the dolly. Conventional steering mode also is used, for example, when multiple panning or camera turning shots are needed. These types of filming shots might occur during an action sequence where the subject is moving through a hallway having curves or turns.

As is well known in the camera dolly field, to achieve perfect steering geometry in conventional steering mode, the rear wheels must be oriented so that their axes of rotation intersect at a point on a line passing through the center lines of the front wheels. Deviation from these steering angles causes the tires to scrub, if even only slightly, rather than rolling freely. This principle is illustrated in FIG. 47A where X and Y are the rear wheels of the dolly, and K and L indicate the tread and wheelbase respectively, and is explained in detail in U.S. Pat. No. 5,174,593, incorporated herein by reference.

Most camera dollies are also capable of crab steering, which is a steering mode where all wheels of the dolly are steered to the same angle. The crab steering mode, which is commonly used more often than the conventional steering mode, allows the dolly to move forward or back, left or right, or at any angle, as shown in FIG. 44, without changing the "azimuth" camera angle of the camera, or the angular position of the dolly. Accordingly, the crab steering mode offers great versatility. When the subject being filmed is distant from the camera lens, the dolly may be shifted laterally, using the crab steering mode, without significantly affecting the camera angle.

In crab steering mode, no steering angle correction is needed or provided. All of the wheels are coupled via chains or belts to the steering bar or handle, and all of the wheels turn together. The wheel rotation axes of all the wheels always remain parallel to each other. The steering angle of each wheel is identical and tracks the steering angle of the steering handle or bar. A shift mechanism is provided to shift between crab and conventional steering modes, depending on the needs of the camera movement sequence. In existing dollies, shifting between steering modes is achieved through movement of a lever, a shift pedal, or other device.

Some camera dollies also provide a round steering mode. In the round steering mode, all of the dolly wheels are turned by the steering system. The front and rear wheels along each side of the dolly are turned in equal, but opposite direction, as shown in FIGS. 43 and 47B. The wheel rotation axis of all the wheels intersect at approximately a common point, located on a lateral center line of the dolly. This allows the dolly to rotate about its geometric center or another point on the lateral center line. Round steering allows the dolly to be turned around in a very tight space as the dolly turns within its own length. In contrast, with conventional steering, almost twice as much space would be needed to turn the dolly around. Round steering must also be "corrective" in that for proper round steering, the wheel angles must be adjusted to compensate for the steering geometry of the dolly.

While certain camera dollies have previously provided conventional, crab and round steering modes, these dollies generally required multiple operator movements to shift between these steering modes. These shifting movements have required the dolly operator to remove at least one hand from the steering bar to shift between modes, thereby making it difficult or impossible for the dolly operator to continuously and accurately move and steer the dolly, while simultaneously shifting between shifting modes. As split second timing is often required during filming or taping, to appropriately move and position the camera, even the short delay in moving a hand from the steering bar, to a shift lever, can be a significant disadvantage. In addition, unless the operator is highly experienced, the operator will have to look down to locate the shift lever. The operator is therefor unable to continuously watch the dolly, or look for cues, marked floor positions, etc. As a result, dolly operation can be difficult.

In addition, the steering systems in virtually all camera dollies which provide steering and shifting between steering modes, are integrally built in to the dolly, and can be replaced or modified only with substantial difficulty. Accordingly, when a steering system is damaged or otherwise requires service, the dolly becomes unavailable for use until the service or repair can be made.

Accordingly, there remains a need for an improved camera dolly, and for a camera dolly having an improved steering system.

SUMMARY OF THE INVENTION

To these ends, a camera dolly includes a camera steering unit which provides for shifting between corrective or conventional steering, crab steering, and round steering, without the operator removing the hands from the steering bar. Preferably, the steering unit has a first transmission and a second transmission linked together for simultaneously shifting between conventional, crab and round steering modes. A differential advantageously has sprockets, which move to offset positions for conventional and round steering. Chains or belts extend around sprockets on the transmissions and differential, and directly or indirectly to the wheels of the dolly. The first and second transmission and the differential, along with other components form a conventional mode steering system, a crab mode steering system, and a round steering system, each selectable with a single handle movement. Linkages preferably control shifting of the components of the differential, and also control movement of dynamic idlers, to maintain appropriate chain tension or belt tension. The camera dolly may be quickly and easily shifted between steering modes with both of the operator's hands remaining on the steering bar, and without the need for the operator to look or feel for a shifting lever.

BRIEF DESCRIPTION OF THE DRAWINGS

Other objects and features of the invention will become apparent from the following detailed description taken in connection with the accompanying drawings, which disclose the preferred embodiment of the invention. It is to be understood, however, that the drawings are designed for the purpose of illustration only, and are not intended as a definition of the limits of the invention.

In the drawings, wherein similar reference characters denote similar elements throughout the several views:

FIG. 5 is a section view of the T-bar steering handle of the dolly of FIG. 1;

FIG. 6 is a top view taken along line 6—6 of FIG. 5;

FIG. 9 is a schematic perspective view of the arrangement of the ten chains of the steering system as viewed from the steering position or back of the camera dolly;

FIG. 10 is a plan view of the steering system installed in a camera dolly, with the top plate removed for clarity of illustration;

FIG. 11A is a plan view of the right conventional chain;

FIG. 11B is a plan view of the differential middle sprocket chain;

FIG. 11C is a plan view of the right rear chain;

FIG. 12 is a plan view of the right round chain;

FIG. 13 is a plan view of the left round chain;

FIG. 14 is a plan view of the first or left crab chain;

FIG. 15 is a plan view of the second or right crab chain;

FIG. 16 is a plan view of the front left chain;

FIG. 17 is a plan view of the left conventional chain;

FIG. 18 is a plan view of the front right chain;

FIG. 23A is a plan view of the differential middle plate;

FIG. 23B is a side view thereof;

FIG. 28 is a right side perspective view of the links block;

FIG. 29 is a left side perspective view thereof;

FIG. 30 is a plan view of the links blocks and attached links;

FIG. 31 is a cross sectional elevation view of the links block and attached links;

FIG. 34A is a bottom view looking up of the leg position shift links shown in FIG. 33;

FIG. 34B is an isolated plan view of a link and slot arrangement as shown in FIG. 34;

FIG. 34C is a partial top view of the leg position shift handle;

FIG. 34D is a side view thereof;

DETAILED DESCRIPTION OF THE DRAWINGS

The Dolly Chassis

Figure 1:
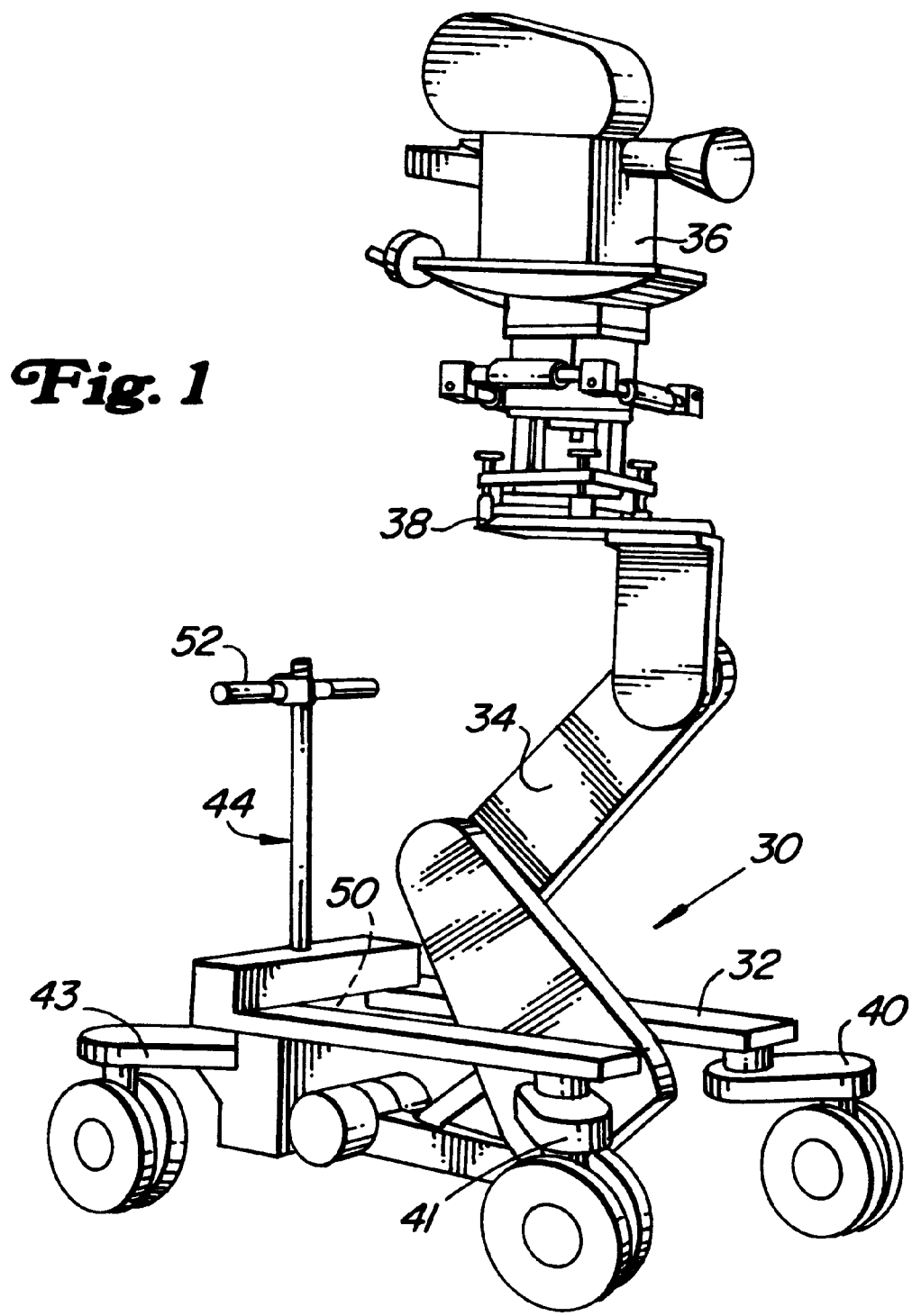
FIG. 1 is a perspective view of the present camera dolly.

Turning now in detail to the drawings, as shown in FIGS. 1–4, a camera dolly 30 has a chassis 32. A hinged or articulating arm 34 is supported on the chassis 32. A camera platform 38 on top of the arm 34 supports a motion picture, video, or television camera 36. The dolly 30 has front left and right legs 40 and 41, and rear left and right legs 42 and 43 pivotally attached to the chassis 32.

The Steering Handle

A T-bar handle 44 extends up from the back end of the chassis 32. Inside of the chassis 32, the lower end of the T-bar handle 44 connects to a steering unit 50, which can steer all of the wheels of the dolly and shift to select steering modes.

Figure 19A:
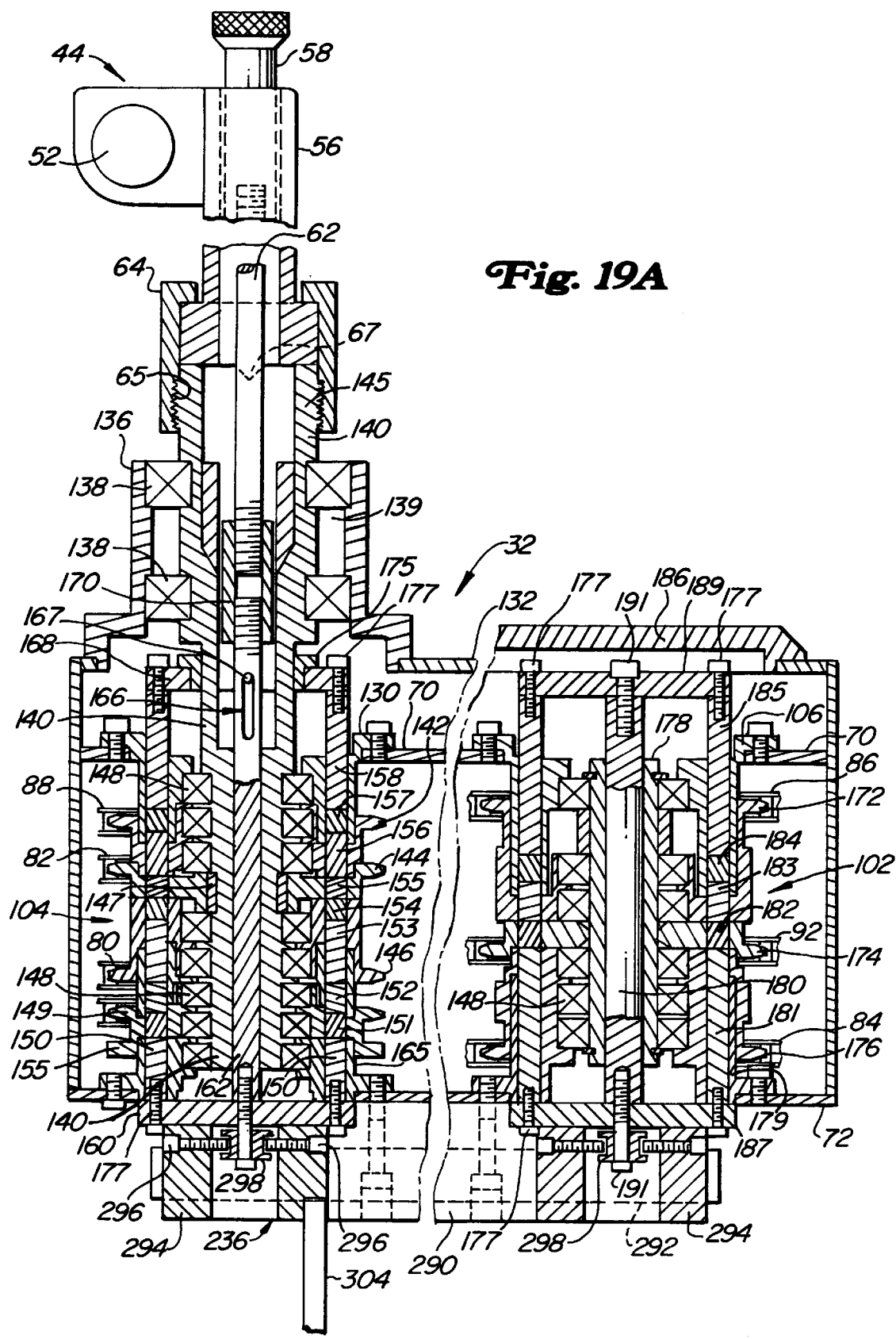
FIG. 19A is a partial section view of the steering system showing the front and rear transmissions (in the conventional or corrective steering mode)
Figure 27:
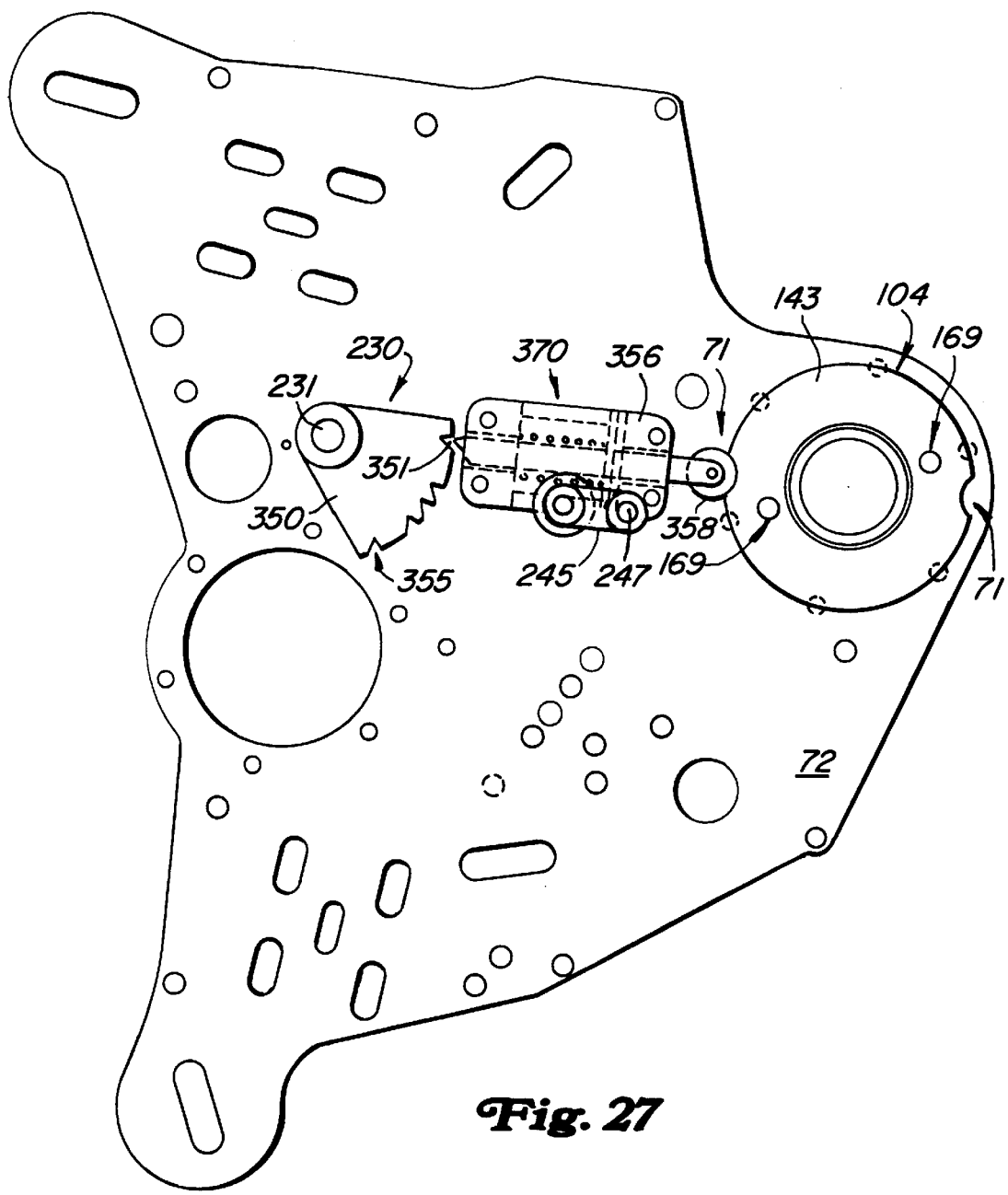
FIG. 27 is a partial plan view showing the arrangement of the links block, shift lock, and indent wheel of the rear transmission.

Turning to FIGS. 5, 6, and 27 the T-bar handle 44 includes a horizontal handle bar 52 having a pinion gear sector 54. The handle bar is pivotally mounted on a handle housing 55 supported on a handle tube 56. A rack bar 58 extends within the handle tube 56. Rack teeth 60 on the rack bar 58 mesh with gear teeth on the pinion gear sector 54. A top end of a connecting rod 62 is threaded into the rack bar 58 and extends down through the bottom on the handle tube 56. The bottom end of the connecting rod 62 is threaded into a pin plate rod 162 in the rear transmission 104, as shown in FIG. 19A. A tube cup 64 having a threaded lower end 65 is slidably positioned around the handle tube 56, and used to attach the handle to the steering unit 50. Wedge keys 67 on a drive sleeve 68 assure positive locking to steering system 50. (FIG. 5).

The T-bar handle 44 shown in FIG. 5 and 6 is used for steering the dolly and for shifting the steering unit 50 of the dolly 30 between different steering modes. The steering unit 50 will now be described in detail, followed by an explanation of the interconnection and operation of the handle 44 and steering unit 50.

The Steering Unit

Figure 7:
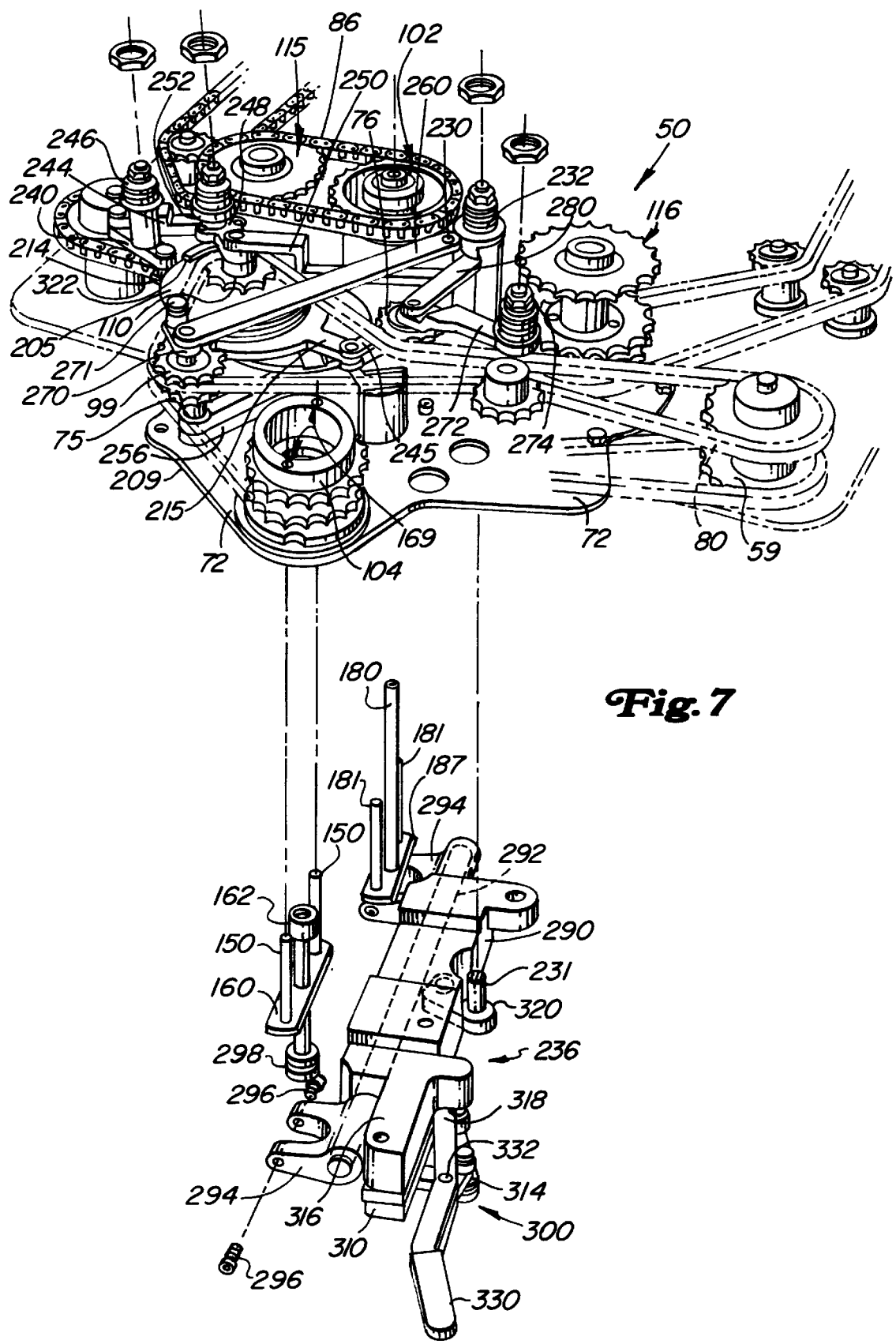
FIG. 7 is an exploded perspective view of the steering system with the top plate and other components removed for clarity of illustration.
Figure 8B:
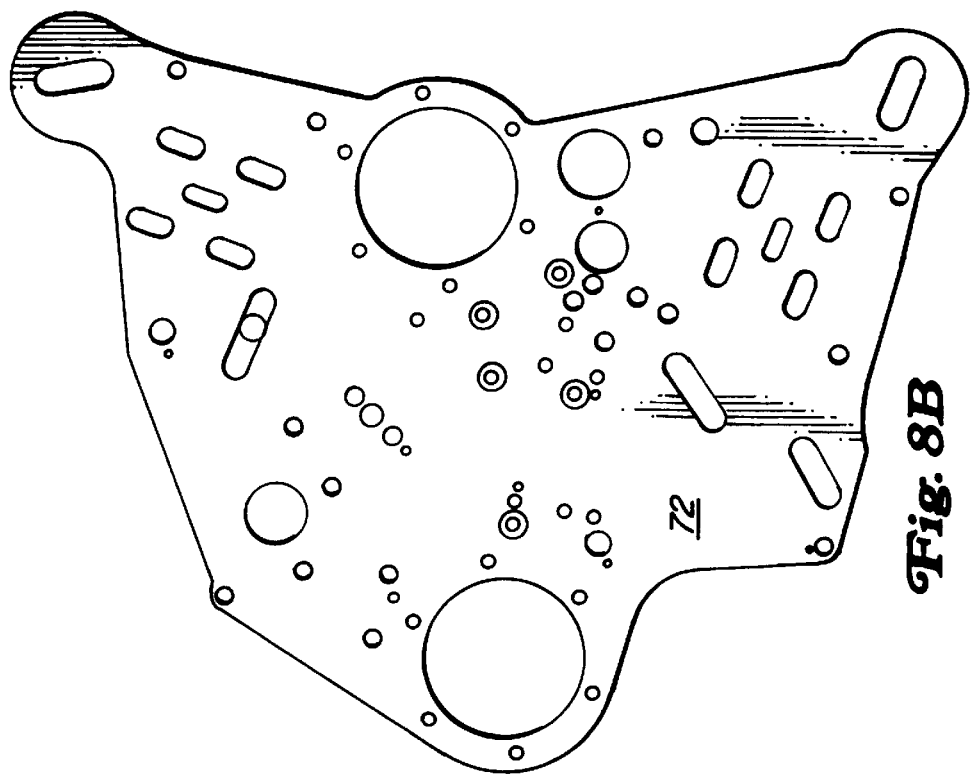
FIG. 8B is a plan view of the bottom plate shown in FIG. 2.
Figure 8A:
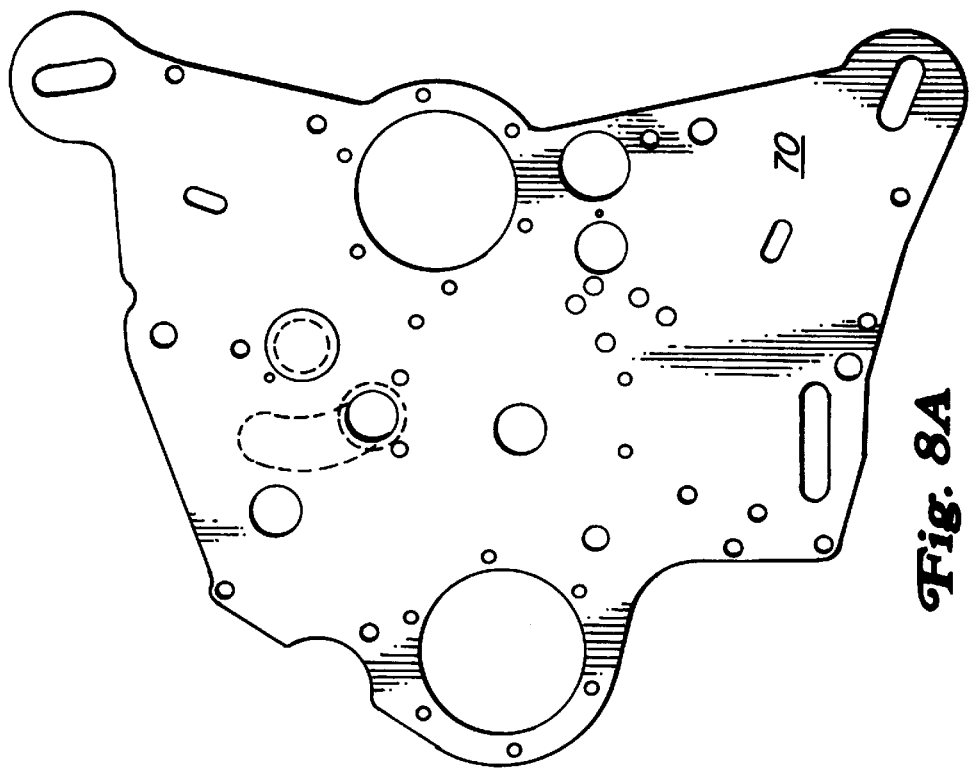
FIG. 8A is plan view of the top plate shown in FIG. 2.

The steering unit 50 is generally shown in FIGS. 2–4 and 7–20. The top plate 70, separately shown in FIG. 8A, has been removed from FIG. 7, for illustration purposes. Referring to FIG. 7, the steering unit 50 includes a front transmission 102 and a rear transmission 104 supported on a bottom plate 72. The bottom plate 72 is separately shown in FIG. 8B. A rear transmission distributor 116, and a front transmission distributor 115 are rotatably attached between the top and bottom plates 70 and 72. A differential 108 is also attached to the bottom plate 72. Chains extend around various sprockets and idlers and ultimately control the steering angle of the wheels.

The Dolly Sprockets

Figure 2:
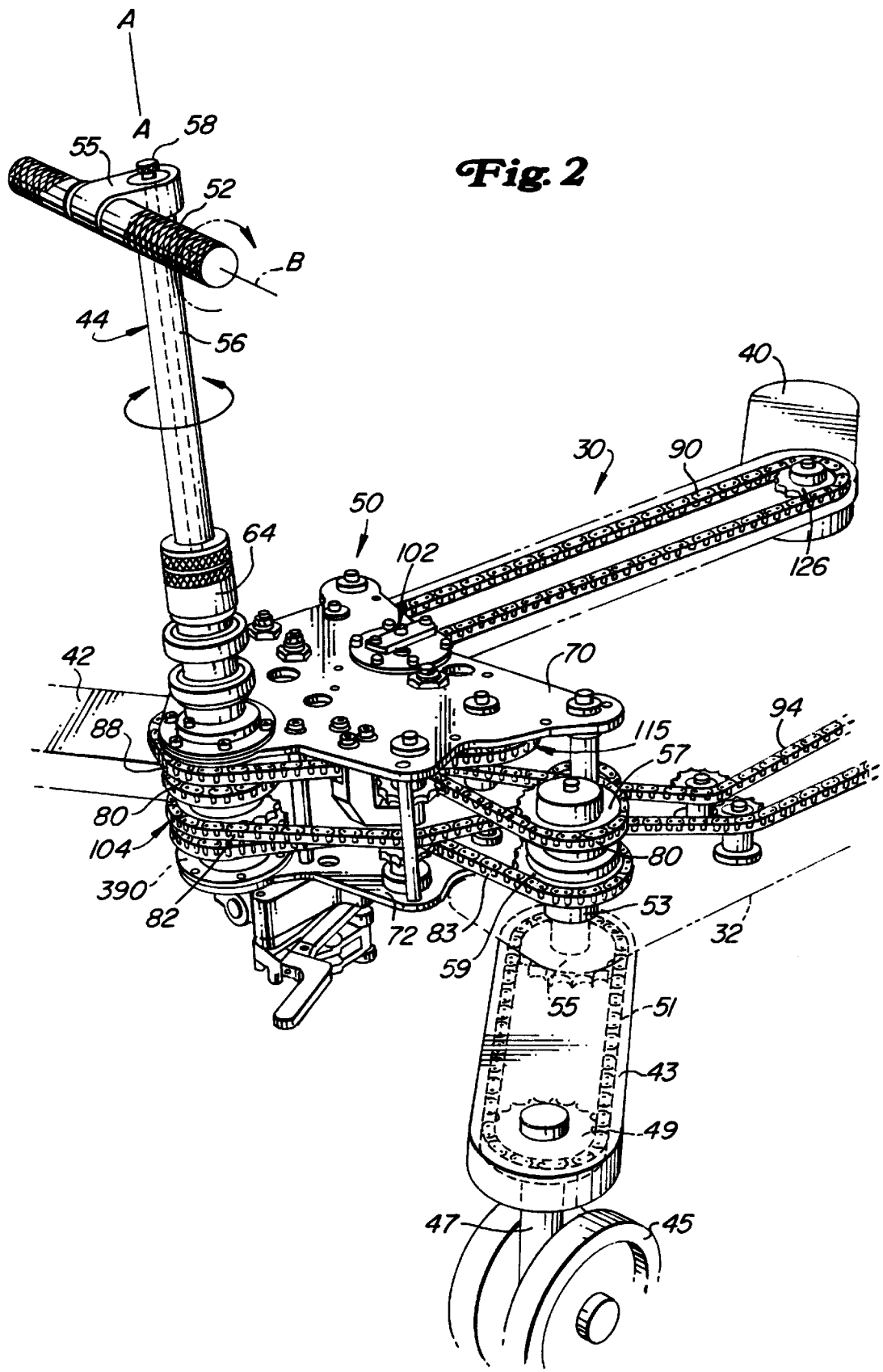
FIG. 2 is a back and right side perspective view of the steering system of the dolly shown in FIG. 1.
Figure 3:
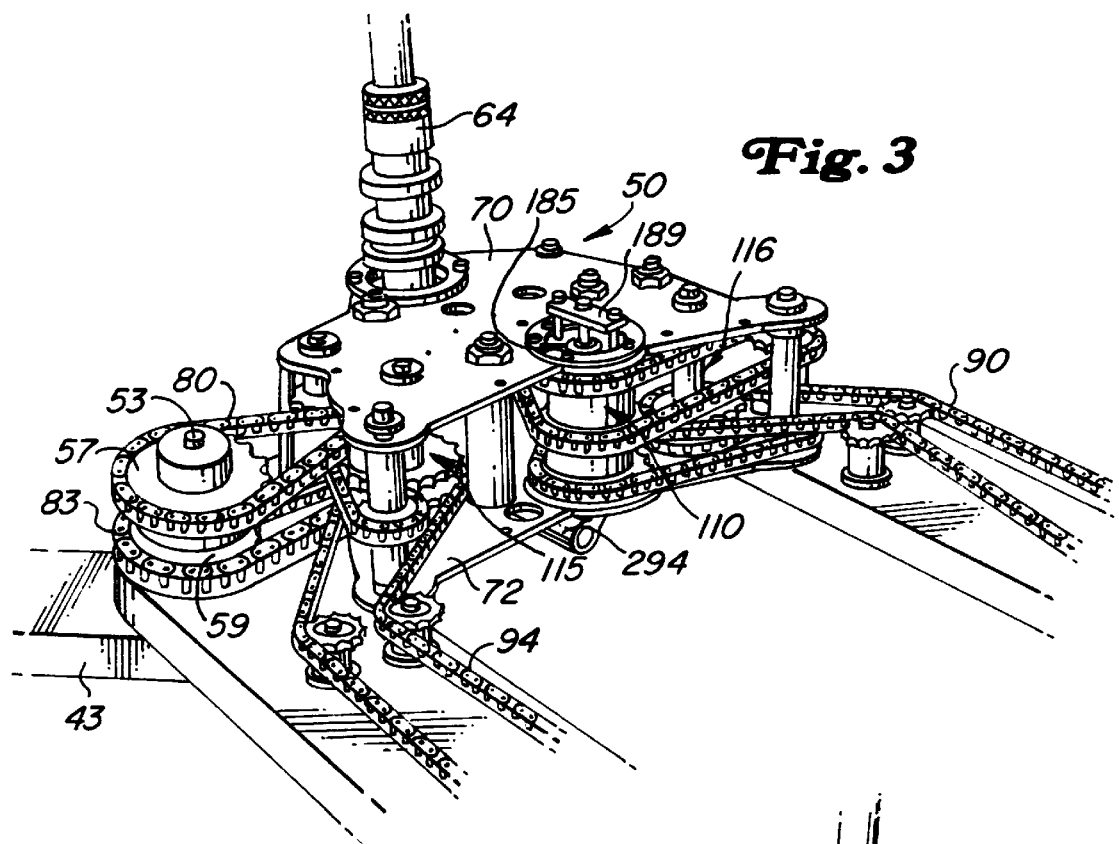
FIG. 3 is a front and right side perspective view thereof.
Figure 4:
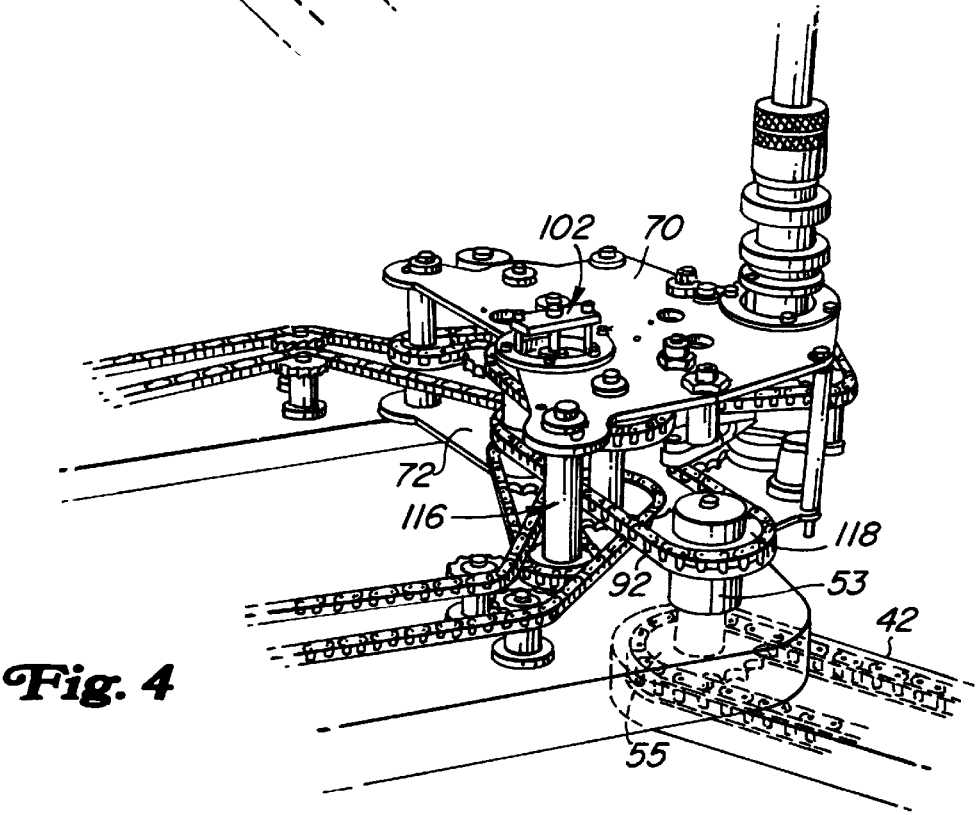
FIG. 4 is a front and left side perspective view thereof.

As shown in FIG. 2, with the right rear wheel shown as representative, the wheels 45 of the dolly are rotatably supported on a king pin 47. In the embodiment shown, a pair of spaced apart dihedral wheels are shown, although other wheel arrangements, including single wheels, may be used. A king pin sprocket 49 is fixed to the top end of the king pin 47. A leg chain 51 connects the king pin sprocket 49 with a lower axle sprocket 55 on an axle 53. A right drive sprocket 57 is irrotatably fixed to the axle 53. A right conventional chain 80 connects the right drive sprocket into the steering system 50. A lower right rear sprocket 59 is also irrotatably fixed with set screws (which allow rotational adjustment during manufacture or maintenance) to the axle 53 and connects into the steering unit 50 via a right rear chain 83, as further described below. On the rear left leg 42, as shown in FIG. 4, a left conventional chain 92 extends around a left rear drive sprocket 118.

Referring to FIGS. 2 and 9, inside the chassis at the front legs 40 and 41, a front left chain 90 and a front right chain 94 engage a front left drive sprocket 126 and a front right drive sprocket 128, respectively, which drive the steering of the front wheels.

The Steering Unit Sprockets

Figure 19B:
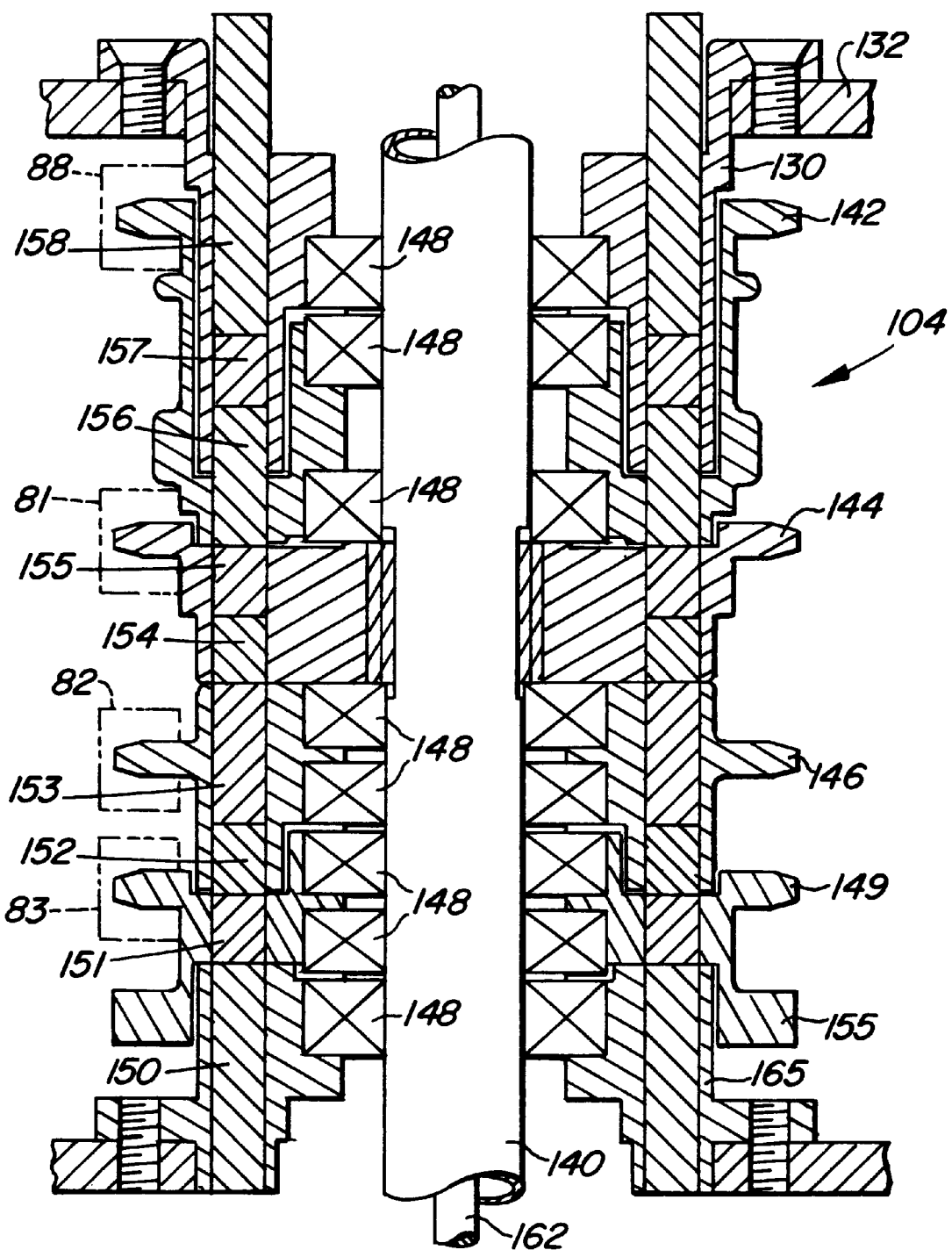
FIG. 19B is an enlarged partial section of the rear transmission.

Turning briefly to FIGS. 19A and 19B, the rear transmission 104 has a top sprocket 142, a first center sprocket 144, a second center sprocket 146, and a lower sprocket 149. The front transmission 102 similarly has a top sprocket 172, a center sprocket 174, and a lower sprocket 176.

Figure 20:
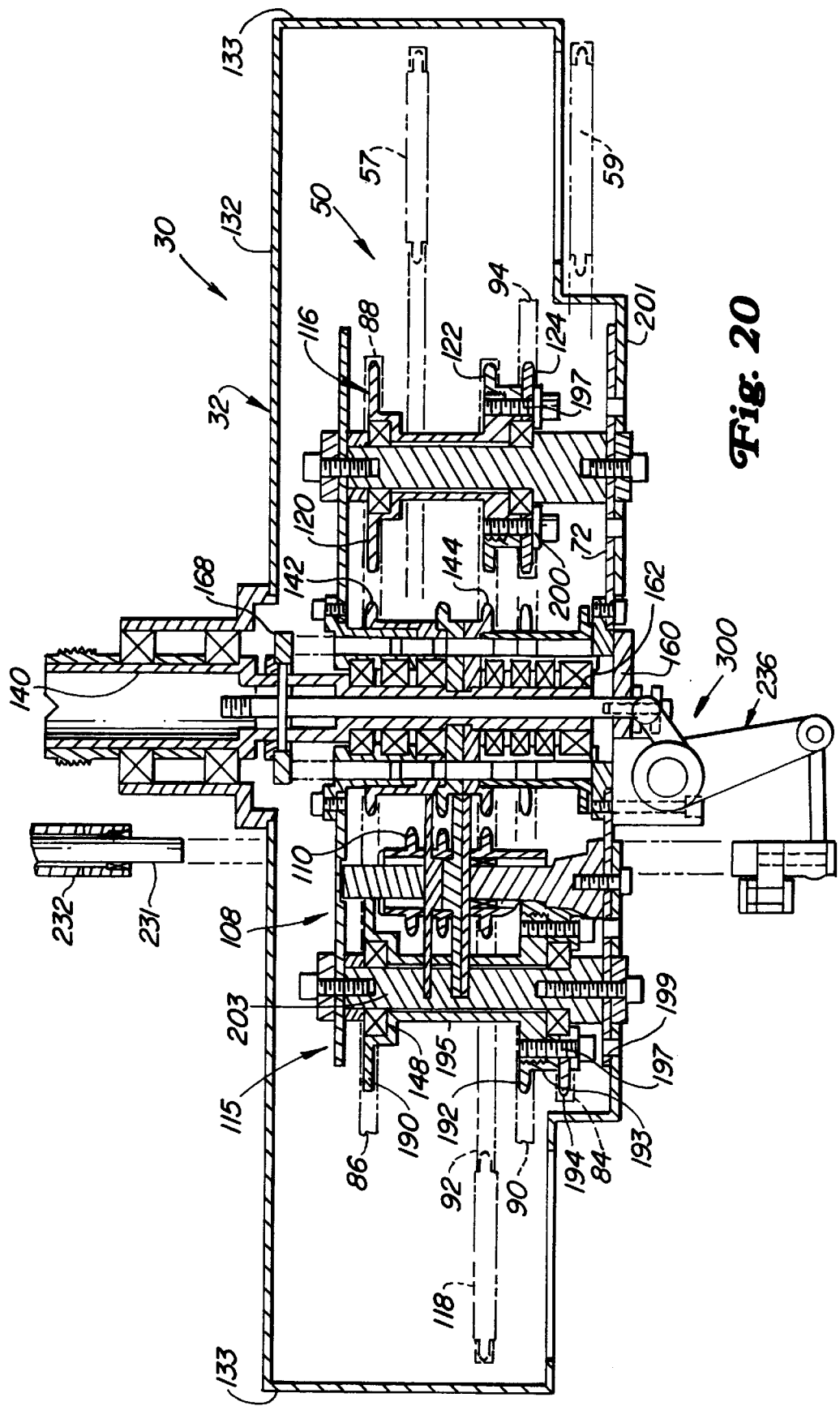
FIG. 20 is a rear elevation view, in part section, of the steering system installed in a dolly chassis.
Figure 24:
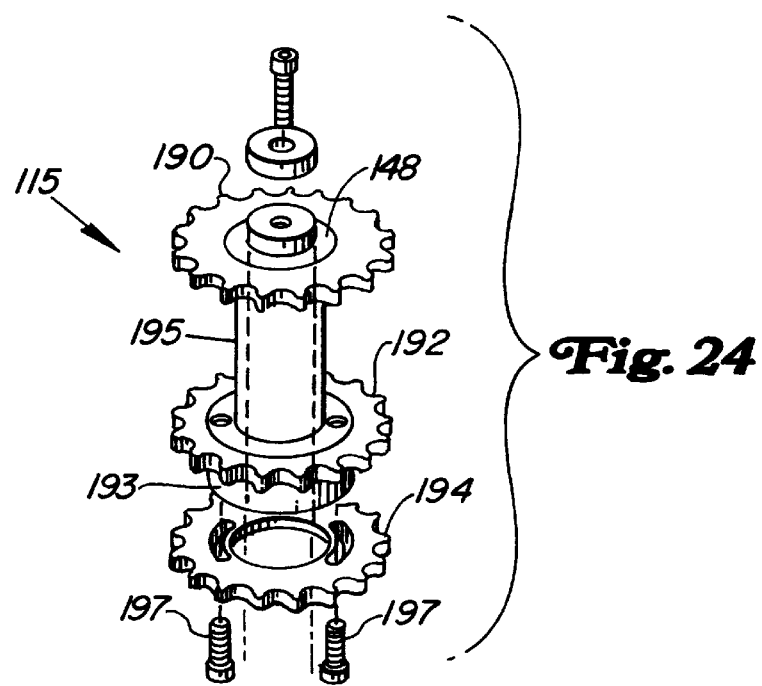
FIG. 24 is an exploded perspective view of the front transmission distributor.

Referring momentarily now to FIGS. 20 and 24, the front transmission distributor 115 has a top sprocket 190, a middle sprocket 192, and a lower sprocket 194. Similarly, the rear transmission distributor 116 has a top sprocket 120, a middle sprocket 122, and a lower sprocket 124. All three sprockets on the front transmission distributor 115, and on the rear transmission distributor 116, are locked together (except during assembly or adjustment). In contrast, the sprockets of the front 102 and rear 104 transmissions may or may not be locked together, depending on the steering mode selected. The front and rear transmission distributors 115 and 116 may be the same, except for the vertical positions of their sprockets. A distributor plate 200 under the lower sprocket 194 helps to even out the clamping force of the bolts 197.

Figure 21:
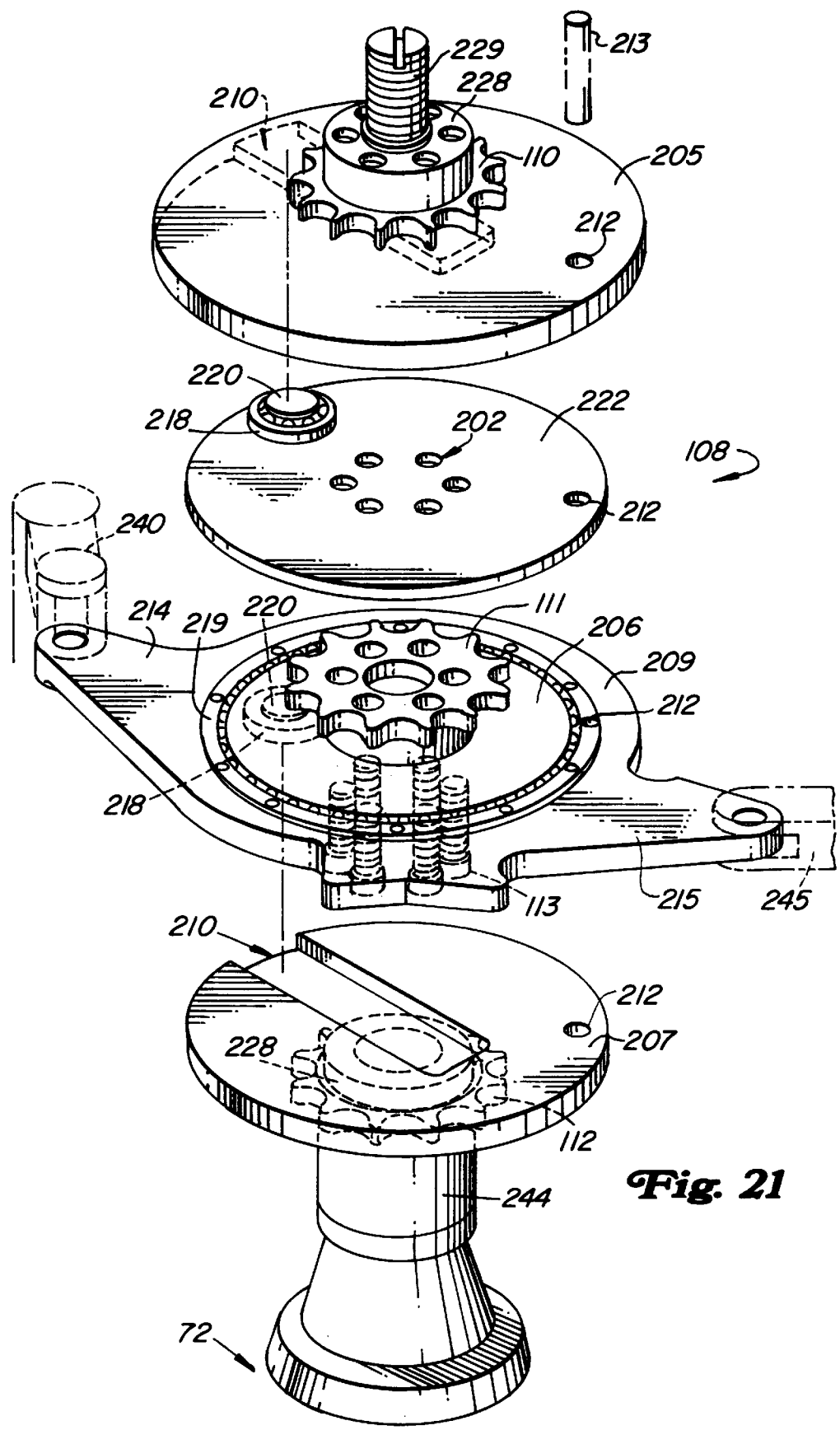
FIG. 21 is an exploded perspective view of the differential.
Figure 22:
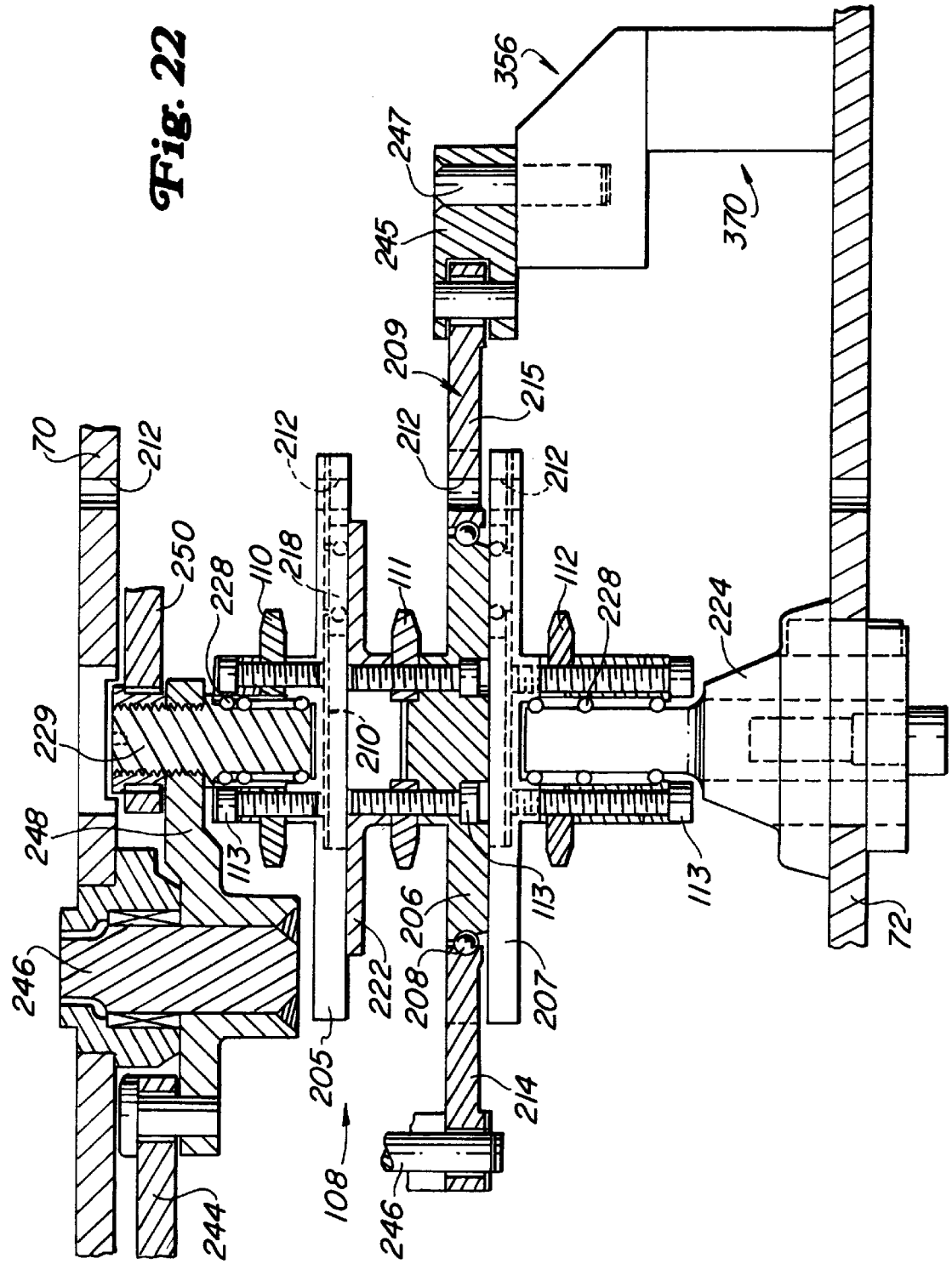
FIG. 22 is a section view of the differential.
Figure 23D:
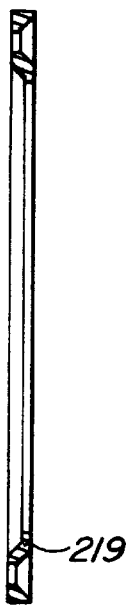
FIG. 23D is a section view thereof.
Figure 23C:
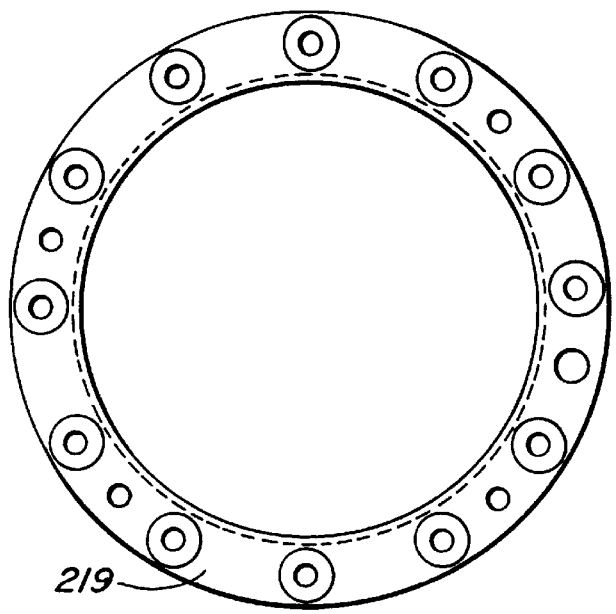
FIG. 23C is a plan view of the differential middle plate retainer ring.

Referring momentarily to FIGS. 21 and 22, the differential 108 includes top, middle and bottom sprockets 110, 111, and 112, which turn together, and can be aligned or offset from one another, as required for different steering modes.

The Chains and Idlers

Setting aside momentarily the various other components and details shown in FIGS. 7–20, the chains in the steering unit 50 are first separately described and shown to provide a better understanding of the steering system 50. The terms "conventional", "crab", and "round" are used below for convenience only, and are standard terms of art in the field of camera dollies. These terms as used below generally refer to the steering mode which a chain is primarily involved with. The term "corrective" steering means the same as "conventional" steering. These terms do not describe any characteristic of the chain itself. Indeed, all ten of the chains in the steering unit 50 are preferably identical, except in length. The chains are preferably pre-stretched and lubricated. (The chains within the articulating legs 40–43 and chassis 32 are not part of the steering unit itself, in that the steering unit 50 can be removed or retrofitted from the dolly 30 without removing them from the dolly.)

The Figures are drawn in proportion to reflect the preferred size, shape and positional relationships of various components. The terms right and left refer to the operator's hands when operating the dolly in the usual way, i.e., standing or walking behind the dolly while facing forward with the hands on the T-bar. Each of the ten chains is shown as used in FIG. 9 and then separately in FIGS. 11–18, for clarity of illustration. Some of the fixed idlers are omitted from FIG. 9 to better show the certain design features. The fixed idlers are rotatably attached to the top or bottom plate 70 or 72, or to both plates, and are shown in other Figures.

Turning to FIGS. 9 and 11A, a right conventional chain 80 extends around the top sprocket 110 on the differential 108, around a conventional chain rear active idler 99 and around the right rear drive axle sprocket 57. A fixed idler 100 tensions the chain 80 between the active idler 99 and sprocket 57. A conventional chain front active idler 76 tensions the chain 80 between the sprocket 57 and the sprocket 110. The movement of the active idlers 99 and 76 is driven by movement of the various links coordinated with the movement of other components of the steering unit 50, to keep tension on the chain 80 despite movement of the sprockets around which chain 80 passes, during shifting between steering modes.

As shown in FIG. 11B, a differential middle sprocket chain 81 extends around the first center sprocket 144 of the rear transmission 104, around a middle differential sprocket chain rear active idler 75, and around the middle differential sprocket 111. A middle differential sprocket chain front active idler 77 tensions the chain 81 between sprockets 111 and 144. The active idlers 75 and 77 similarly maintain tension on the chain 81.

As shown in FIG. 11C, a right rear chain 83 extends around the lower sprocket 149 of the rear transmission 104 and around the lower right rear sprocket 59 on the axle 53. The chain 83 is tensioned by fixed idlers 78 and 79.

As shown in FIGS. 9 and 12, a right round chain 82 extends around the lower sprocket 146 on the rear transmission 104, and around fixed idlers 96 and 98. The back or reverse side of the right round chain 82 engages the center sprocket 122 on the rear transmission distributor 116. Due to the short sector angle of engagement, a chain retainer 326 is provided to prevent the chain 82 from riding up and over the sprocket teeth during high loads.

Referring to FIGS. 9 and 13 a left round chain 84 extends around a lower sprocket 176 on the front transmission 102, and around a fixed idler 85. The back side of the chain 84 wraps partially around a lower sprocket 194 on the front transmission distributor 115. A second chain retainer 324 is positioned adjacent to the sprocket 194.

As shown in FIGS. 9 and 14, a left crab chain 86 extends around the top sprocket 172 on the front transmission 102, and around the top sprocket 190 on the front transmission distributor 115.

As shown in FIGS. 9 and 15, a right crab chain 88 extends around the top sprocket 120 of the rear transmission distributor 116, and around the top sprocket 142 of the rear transmission 104.

Referring to FIGS. 9 and 16, a front left chain 90 extends around the center sprocket 192 of the front transmission distributor 115, passes around fixed idlers 95 and 97, and extends forward within the chassis to a front left wheel drive sprocket 126. Similarly as shown in FIGS. 9 and 18, a front right chain 94 extends around the lower sprocket 124 on the rear transmission distributor 116, around fixed idlers 105 and 101, extends forward within the chassis 32 and around the front right wheel drive sprocket 128, which is shown in FIG. 2.

Turning to FIGS. 9 and 17, the left conventional chain 92 extends around the left rear wheel drive sprocket 118 and around the center sprocket 174 of the front transmission 102. The chain 92 also passes around the lower sprocket 112 of the differential 108, with the back side of the chain 92 also engaging a fixed idler 93.

The ten chains described above connect the various components of the steering system 50. However, the steering unit 50 is self-contained, except for chains 80, 83, 92, 90 and 94, which engage the wheel drive sprockets 57, 59, 118, 126 and 128 respectively of the dolly 30. As a result, when the steering unit 50 is installed into the dolly 30, only chains 80, 83, 92, 90 and 94 need to be appropriately connected. This facilitates fast and relatively easy installation and removal of the steering unit 50 as a unit into and out of the dolly 30.

While the steering unit 50 is shown using chains and sprockets, toothed belts may equivalently be used. The idlers described above as being "fixed" idlers, are fixed in the sense that after the steering unit 50 is installed and adjusted, the fixed idlers are moved (in slotted holes) and then tightened and fixed in place. The fixed idlers rotate, but do not translate or shift during operation of the steering system. In contrast, the four active idlers described above both rotate and change position as the steering unit 50 is shifted between different steering modes, to maintain proper tension in chains 80 and 81. The fixed idlers have sprockets rotatably attached to standoffs which are secured to the top plate 70 or bottom plate 72 of the steering unit 50. The active idlers 99, 76, 75 and 77 are sprockets rotatably attached to movable links.

The Rear Transmission

Referring to FIGS. 19A and 19B, the rear transmission 104 includes a pin plate rod 162 which is threaded into and turns with the handle tube 56. An upper pin plate 168 and a lower pin plate 160 are attached to the pin plate rod 162. The top sprocket 142, first center sprocket 144, second center sprocket 146 and lower sprocket 149 of the rear transmission 104 are mounted on bearings 148 supported on a rear transmission axle 140. An indent wheel 143 is fixed to and/or integral with sprocket 149. The indent wheel 143 is round and has two indents 71 on opposite sides of the perimeter of the wheel 143, as shown in FIG. 9.

The pin plate rod 162 extends vertically upwardly through a bore in the rear transmission axle 140. Referring to FIG. 19A, the rear transmission axle 140 is rotatably mounted on bearings 138 within a receptacle 136 extending up from the top deck 132 of the chassis 32, and within an upper transmission housing 130 and a lower transmission housing 165. A shoulder cap 175, is attached to the rod 162 by a pin 167, slidably movable along the axle 140. The rear transmission axle 140 turns with the handle tube 56. The pin 167 extends through a slot 166 at the upper end of the pin plate rod 162, to attach the rod 162 to the shoulder cap 175 yet allow it to shift vertically. A bushing 170 reinforces and stabilizes the pin plate rod 162 via the guide pin 164. A spacing sleeve 139 spaces the bearings 138 apart. A threaded sleeve 145 is pinned onto rear axle 140.

The sprockets 142, 144, 146, and 149 in the rear transmission 104 and the indent wheel 155, each have a pair of diametrically spaced apart pin clearance holes 169. Referring to FIG. 19B and 19A, a stack-up of nine pairs of shift pins 150–158 of specific varying lengths extend through the clearance holes in the sprockets. The first shift pin 150 is attached to the top of the lower pin plate 160 by screws 177. The other shift pins 151–158 are vertically aligned or stacked-up within the rear transmission housing 165 and upper transmission housing 130 and/or the sprockets 142, 144, 146 and 149 in the rear transmission 104.

The first center sprocket 144 is keyed or pinned to the rear transmission axle 140, and therefore always turns with the axle 140 and steering handle 56. The other sprockets in the rear transmission 104 can be free spinning or locked into connection with the first center sprocket 144, depending upon the vertical position of the shift pins 150–158, as driven by up and down movement of the lower pin plate 160 and upper pin plate 168. FIG. 19A shows the front and rear transmissions 102 and 104 in the conventional steering mode.

The Front Transmission

Referring still to FIG. 19A, the front transmission 102 has a similar arrangement of sprockets and pins, but without the fourth and lower sprocket 149 and indent wheel 143. Specifically, the center sprocket 174 is part of or attached (i.e., pinned or welded), to a front transmission axle 178 rotatably supported by bearings 148 with shift rod 180 slidably passing through. Shift rod 180 shifts vertically during shifting of the steering unit 50, but does not rotate. The top sprocket 172 and bottom sprocket 176 are rotatably mounted on the axle 178 via bearings 148. A stack-up of shift pins 181–185 extends through the front transmission housing 179 and upper housing 106 and the sprockets 172, 174 and 176 in the front transmission, similar to the design described above for the rear transmission.

A raised cover 186 is provided as part of the top deck 132 of the chassis 32, to provide vertical clearance for the top ends of the fifth shift pins 185. The first shift pins 181 are attached to a lower pin plate 187. The fifth shift pins 185 are attached to an upper pin plate 189. The lower pin plate 187 and the upper pin plate 189 are bolted to the ends of the shift rod 180 via end bolts 191. The lower end bolt has a grooved cap 298 attached to a transmission linkage 236 (further described in connection with FIGS. 33 and 34 below) which causes the front and rear transmissions to shift together. As the lower plate 187 is pushed up or pulled down by operation of the transmission linkage 236, the shift pins are correspondingly pushed up or pulled down through the clearance holes in the sprockets, to engage or disengage the top sprocket 172 and lower sprocket 176 to the center sprocket 174, which is permanently attached to the front transmission axle 178. The shift rod 180 can slide vertically within the bore in the front transmission axle 178, to allow shifting to take place.

While the front and rear transmissions are shown here as separate, they may also be combined into a single transmission. This would require more height, but less width or depth for the steering unit.

The Front and Rear Transmission Distributors

Turning to FIGS. 9, 20 and 24, the front transmission distributor 115 is made up of the front distributor top sprocket 190, center sprocket 192, and lower sprocket 194. During operation of the steering system 50, all three of these sprockets are locked together and turn as a unit. The bottom sprocket 194 is substantially flat. The center sprocket 192 has a short shaft section 193. The top sprocket 190 has a long shaft section 195. Adjusting bolts 197 pass through clearance holes or slots in the lower sprocket 194 and center sprocket 192 and thread into a land at the lower end of the long shaft section 195. Tool access openings 199 are provided through the lower chassis plate 201 (which supports the lower plate 72 of the steering system 50). This allows the three sprockets to be appropriately adjusted with respect to each other, and then locked together by tightening the adjusting bolts 197. The three sprockets are rotatably supported on a distributor hub 203 by bearings 148. The rear transmission distributor 116 has a similar design, although the vertical position of the center sprocket 122 and bottom sprocket 124 are vertically displaced (above) the center and lower sprockets on the front transmission 115.

Referring still to FIG. 20, the steering system 50, when installed in the dolly 30, is enclosed by the dolly chassis 32, specifically, by the cover plate 132, the chassis side walls 133, and the lower chassis plate 201. The lower chassis plate 201 which is attached to the side walls 133, has a cut-out to provide clearance for the transmission linkage 236.

The Differential

Turning now to FIGS. 21, 22, 23A—23D, the differential 108 has a top differential sprocket 110 mounted on a ball bearing 228. A stud 229 extends up from the bearing 228 and is attached to a link. A top differential plate 205 is irrotatably attached to or integral with the top sprocket 110. A slot 210 having a rectangular cross section is centrally located on the underside of the plate 205.

A center roller plate 222 has a roller 218 mounted on a roller post 220 on the top surface of the plate 222. The plate 222 is irrotatably attached to the differential center sprocket 111, which in turn, is irrotatably attached to an inner race plate 206. As shown in FIG. 21, bolts 113 pass through clearance holes in the sprocket 111 and thread into tapped holes 202 in the plate 222. A roller post 220 extends down from the underside of the inner race plate 206, with a roller 218 mounted on the roller post 220. The inner race plate 206 is rotatably mounted via ball bearings within a center differential plate 209. A cap plate 219 holds the ball bearings in place. The center differential plate 209 has a first arm 214 and a second arm 215 which are attached to links.

Figure 39:
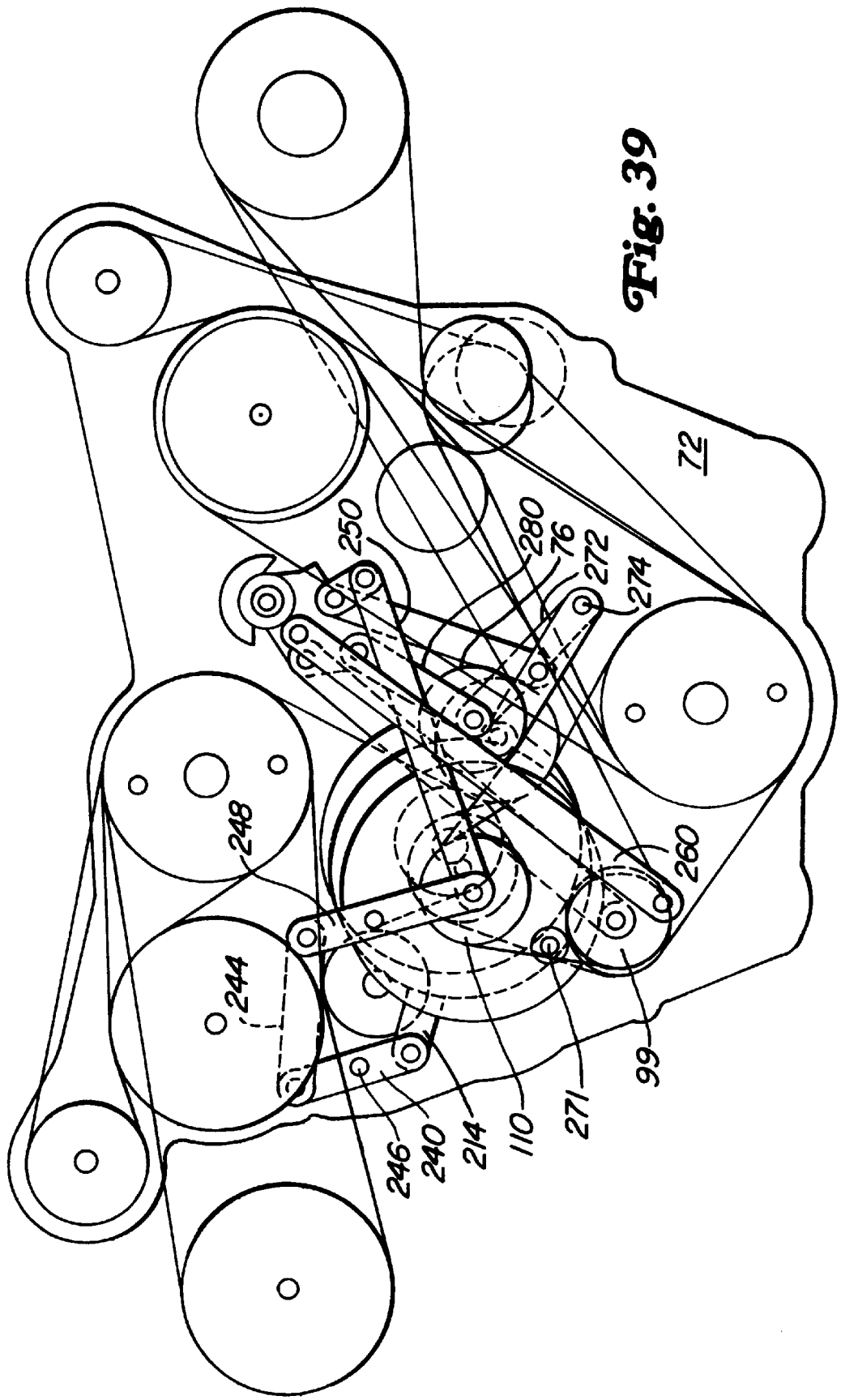
FIG. 39 is a schematic plan view showing the steering system in the conventional or corrective steering mode.
Figure 40:
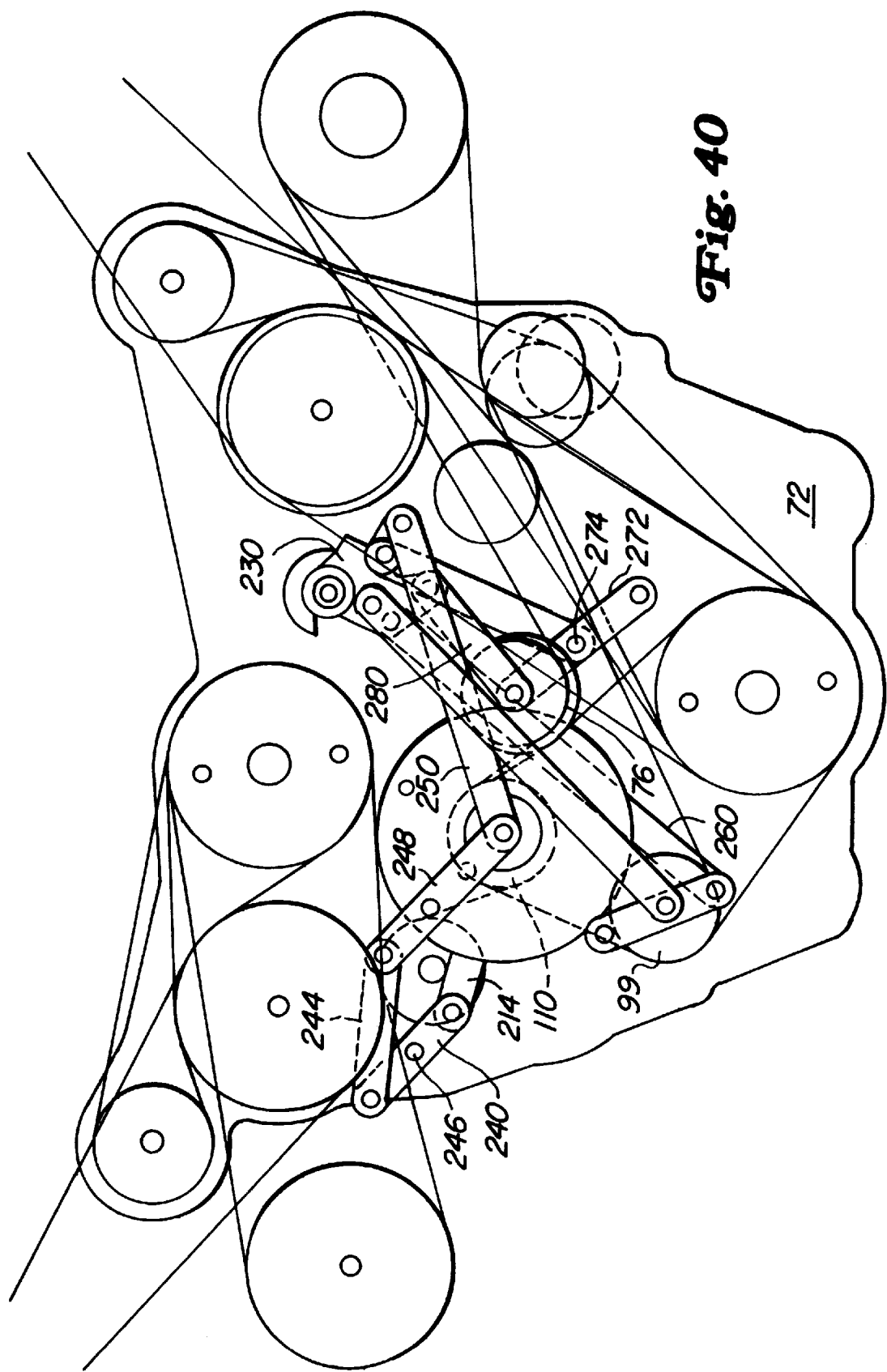
FIG. 40 is a schematic plan view showing the steering system in the crab steering mode.
Figure 41:
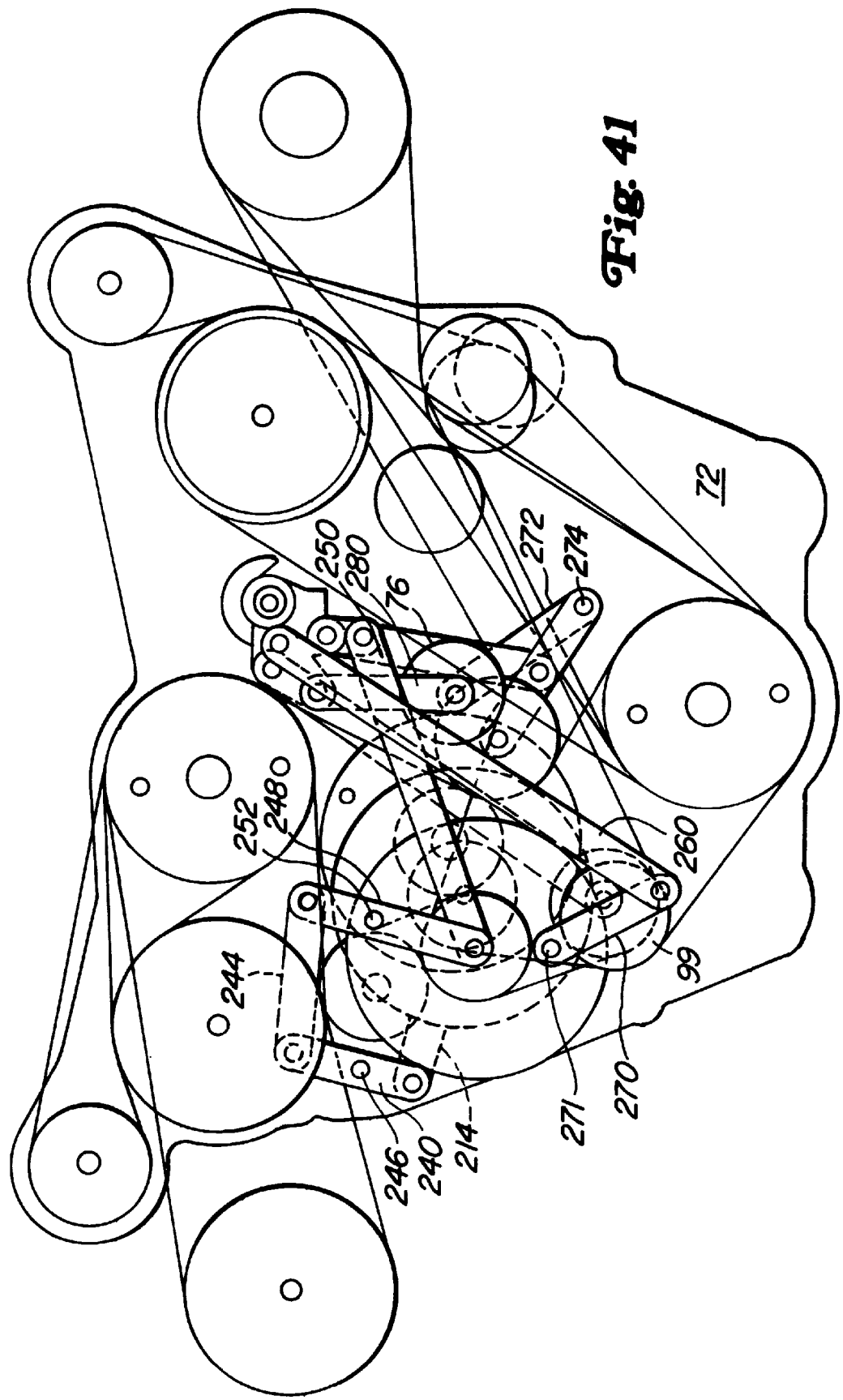
FIG. 41 is a schematic plan view showing the steering system in the round steering mode.

The bottom differential sprocket 112 is mounted on a bearing 228 supported on a stand off 224 which is bolted to the bottom plate 72. A bottom differential plate 207 is irrotatably attached or fixed to the bottom differential sprocket 112. The bottom differential plate 207 includes a slot 210 in its upper surface. The rollers 218 roll within the slots 210. As a result, torque can be transmitted between the sprockets 110, 111, and 112, and the sprockets can be offset from one another as shown in FIGS. 39–41, to provide corrective and round steering. Referring to FIG. 23A, the center differential plate 209 has a lip 223, on one side. The lip 223 slides within a horizontal slot in a stand off, to resist out of plane movements when the steering system is under heavy loads.

Alignment holes 212 pass through the top differential plate 205, roller plate 222, center differential plate 209 and the lower differential plate 207. During manufacture and assembly of the differential 108, these components are aligned and held into alignment by an alignment pin 213 which is temporarily placed in the alignment holes 212. The center sprocket 111 and lower sprocket 112 can be turned relative to the inner race plate 206 and lower differential plate 207 respectively, by loosening bolts which, in use, clamp those sprockets rigidly in place. With the alignment pin 213 in place, the bolts 113 are loosened, the sprockets 111 and 112 are turned slightly for appropriate chain tension, and the bolts 113 retightened to lock the center sprocket 111 onto the inner race plate 206 and to lock the lower sprocket 112 onto the lower differential plate 207.

The Links

The steering unit 50 has a system of moving links. The links provide a mechanical connection between the steering handle, to change the offset of the sprockets of the differential, depending on the steering mode selected. The system of links also provides a mechanical connection between the steering handle and the four active idlers, so that as the steering system 50 is shifted between steering modes and the positions of the top 110 and center 111 differential sprockets change, proper chain tension is maintained on the chains going around those sprockets. The links provide coordinated movement between the steering/shift handle, the top and center differential sprockets, and the active idler sprockets. While other techniques may be used to maintain chain tension, the present system of links is preferred due to its precision and relatively compact size. The system of links provides coordinated movement of the top differential sprocket 110 (which in turn also displaces the center differential sprocket 111) and the four active idler sprockets via five links attached to a pivoting links block 230.

Figure 32:
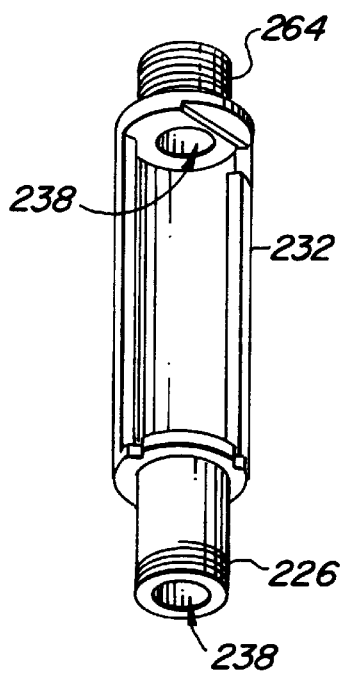
FIG. 32 is a perspective view of the links block housing.
Figure 35:
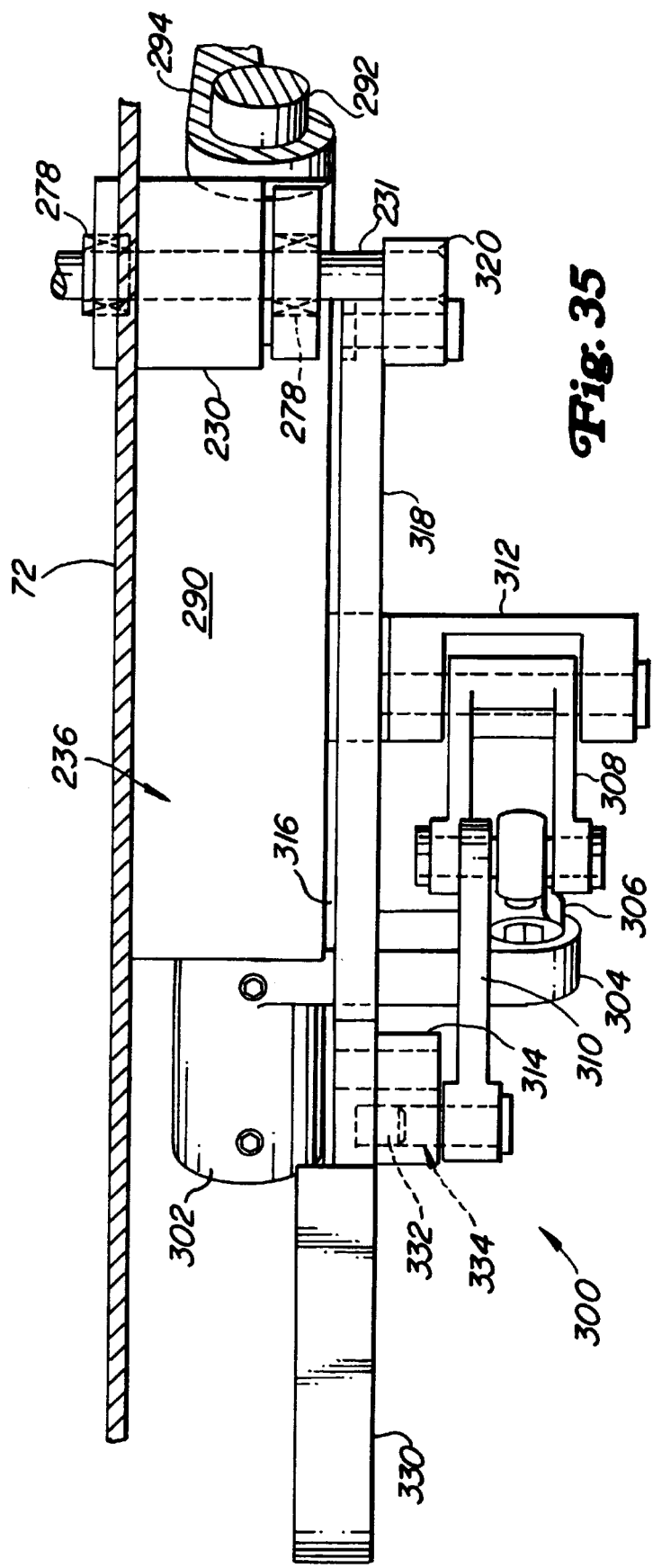
FIG. 35 is a side elevation view thereof taken along line 35—35 of FIG. 34A.
Figure 36:
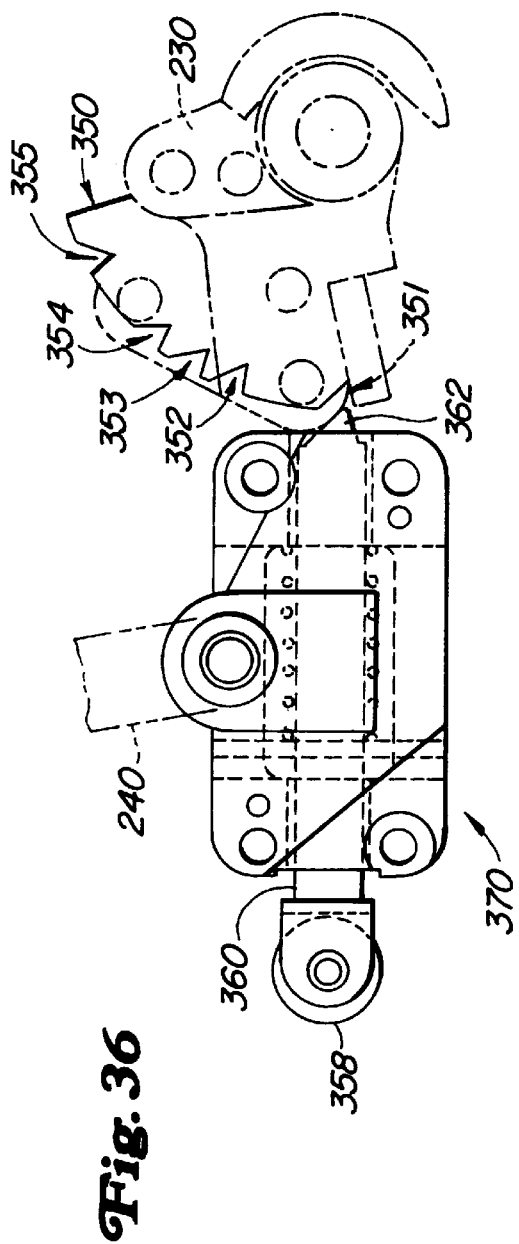
FIG. 36 is an isolated plan view of the links block and shift lock mechanism.
Figure 37:
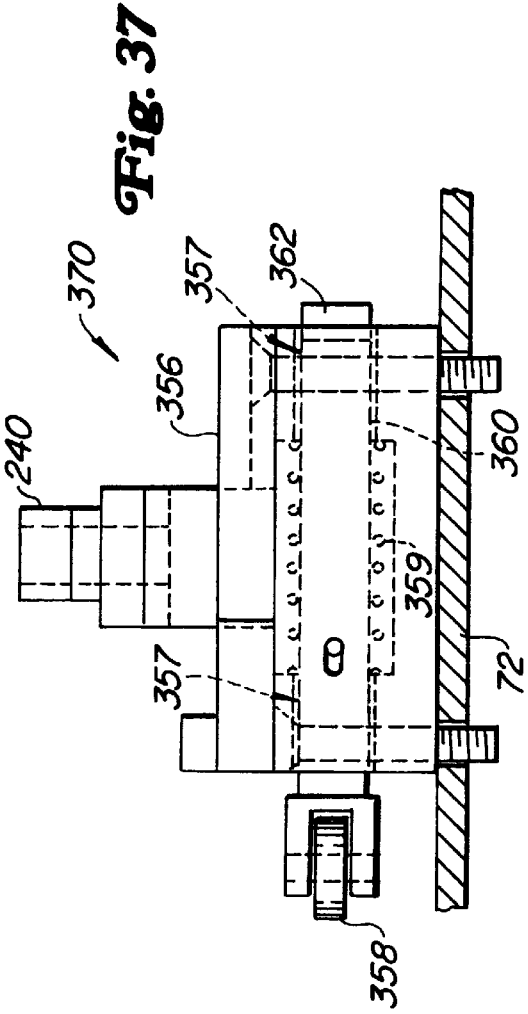
FIG. 37 is a side elevation view thereof.
Figure 38:
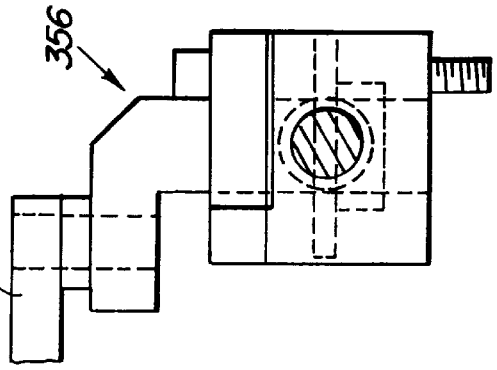
FIG. 38 is a left side end view thereof.

As shown in FIGS. 28–31, the links block 230 is pivotally mounted on a housing 232 on needle bearings 278 supported on a vertical shaft 231. The links block housing 232 has threaded upper and lower ends 264 and 266 (as shown in FIG. 32) which are secured onto the top plate 70 and the bottom plate 72. The shaft 231 extends through a bore 238 in the links block 230.

Figure 25:
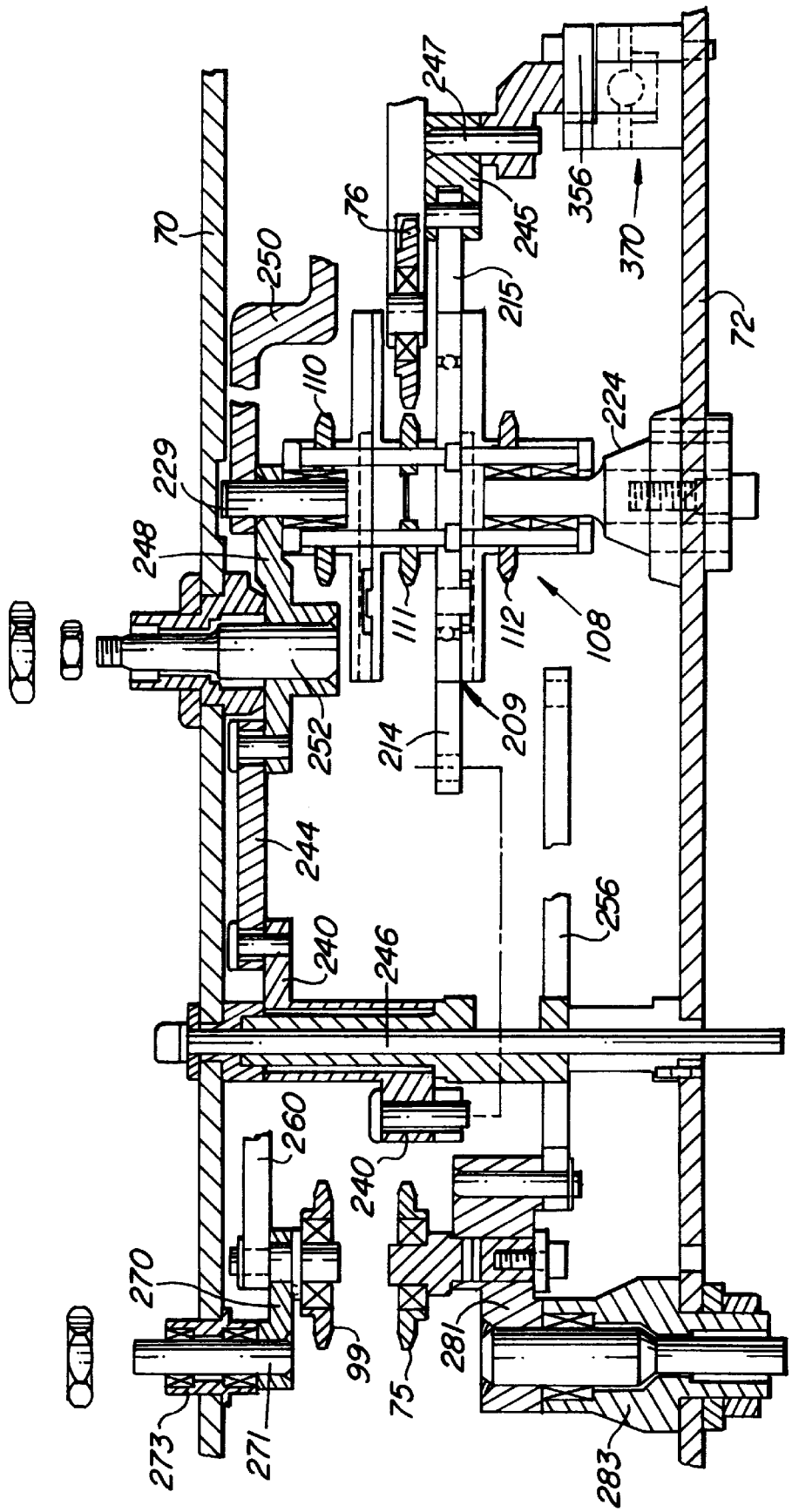
FIG. 25 is a side elevation view of certain shift links and active idlers.
Figure 26:
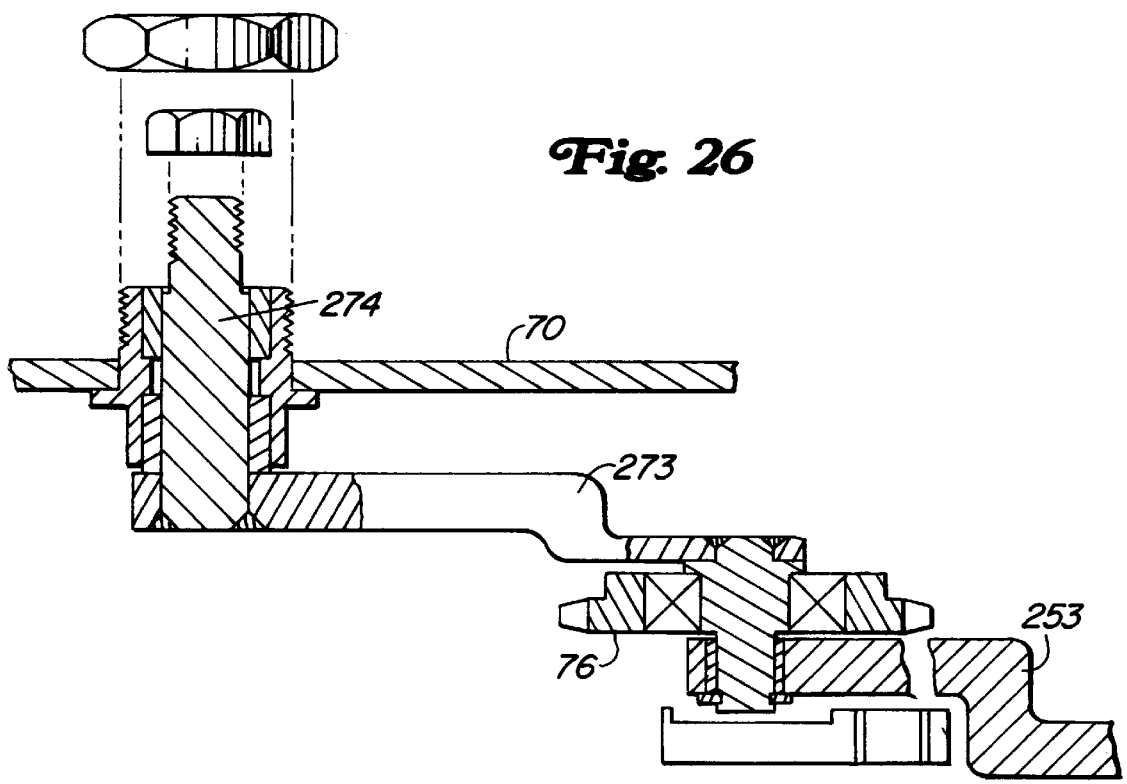
FIG. 26 is an enlarged section view of an active idler.

Five links of the steering system are pivotally pinned onto five arms of the links block 230. Referring to FIGS. 7 and 31, a top link 260 is pivotally pinned to the top arm 262 of the links block 230 and extends diagonally rearwardly to the conventional chain rear active idler sprocket 99. As shown in FIG. 25, sprocket 99 is rotatably attached to a top swing link 270 which is rigidly attached to a pivot post 271 supported by a pivot post housing 273 extending down from the top plate 70.

Referring again to FIGS. 7 and 31, a top differential sprocket link 250 is pivotably pinned or attached to the second arm 268 on the link stand 230 and extends diagonally left to the differential 108 where it is pivotally attached to the stud 229 on the differential, coaxial with the top differential sprocket 110, as also shown in FIG. 25. Referring to FIGS. 7 and 25, one end of a step link 248 is also pivotally attached to the stud 229 under the top sprocket link 250. The step link 248 is pivotably supported on a stand off 252 attached to the top plate 70. The other end or arm of the step link 248 is pivotally attached to one end of a connecting link 244. The other end of the connecting link 244 is pivotally attached or pinned to the front end of an arm link 240. The other end of the arm link 240 is pivotally attached to the first arm 214 of the center differential plate 209. The arm link 240 is also pivotably attached to a standoff 246 extending down from the top plate 70.

Referring back to FIGS. 28–31, a short link 280 is pivotally attached to a third arm 276 on the link stand 230. The short link 280 extends rearwardly to the conventional chain front active idler sprocket 76, as shown in FIGS. 26 and 39–42. An idler link 272 extends from the idler sprocket 76 to a stand off 274 secured to the top plate 70. The link 280 and sprocket 76 are not shown in FIG. 7 for clarity of illustration of other components. Sprocket 76 maintains appropriate tension on the conventional chain 80, between the top differential sprocket 110 and the right rear drive sprocket 57.

Referring once again to FIGS. 28–31, a rear middle link 253 is pivotally attached to the fourth arm 254 on the links block 230. As shown in FIG. 7, link 253 extends rearwardly and is pivotally attached to a generally center location of an idler step link 275. The back end of the link 275 is pivotally attached to the stand off 274 (along with link 272) secured through the top plate 70 and bottom plate 72. The middle differential sprocket chain front active idler 77 is attached to the other end of the link 275.

Figure 42:
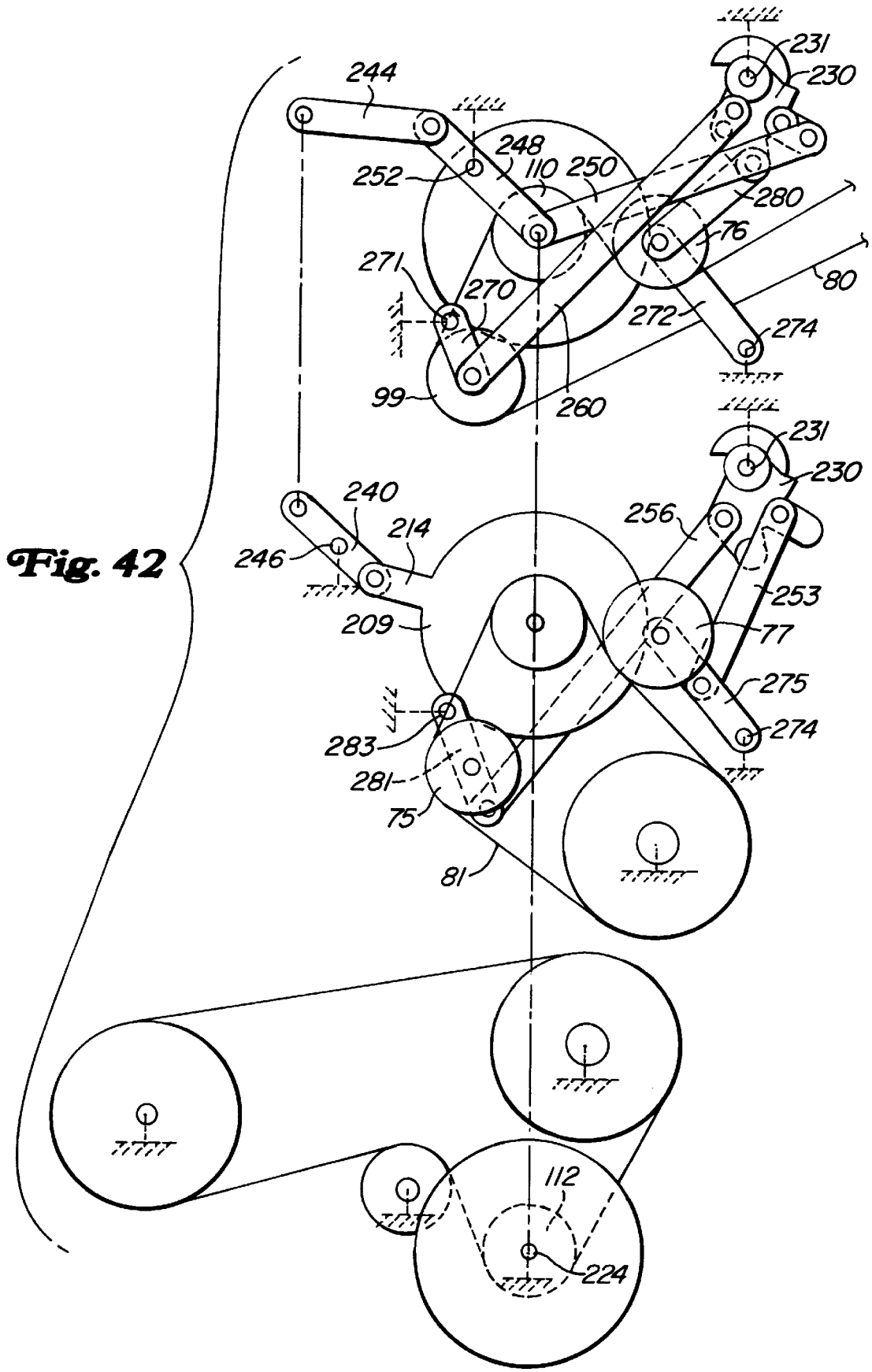
FIG. 42 is a schematic layered view showing the connections between the links and sprockets.

Referring once again to FIGS. 28–31, a bottom link 256 is attached to a fifth arm (or location) 257 towards the bottom of the links stand 230. The bottom link 256 extends diagonally rearwardly and is pivotally attached to a first end of a bottom pivot link 281, as shown in FIGS. 7, 25 and 42. The differential center sprocket chain rear active idler sprocket 75 is supported on the bottom pivot link 281. The other end of the link 281 is pivotally attached to a stand off 283 secured to the bottom plate 72.

The second arm 215 of the center differential plate 209 is pivotally attached to a plate link 245, which in turn is pivotally supported on a shift lock housing 356 attached to the bottom plate 72, as shown in FIG. 25. The pivotal attachments of the links are preferably made via pins, such as pin 247 extending through the plate link 245.

Links 260, 280, 253 and 256 are provided only to maintain appropriate tension on the conventional chain 80 and on the differential center sprocket chain 81, a function which can also be achieved using various other approaches.

The center differential plate 209, together with the links 240, 244, 245, 248 and 250 form a parallelogram linkage which moves the top differential sprocket 110 and the middle differential sprocket 111 relative to the fixed-in-position bottom differential sprocket 112, to provide the appropriate corrective steering angles to the rear wheels, when in conventional steering mode, and to all of the wheels when in round steering mode. The bottom differential sprocket 112 and bottom differential plate 207 are rotatably fixed in position on the standoff 224 attached to the bottom plate 72. Accordingly, the bottom differential sprocket 112 can rotate about its center, but does not shift in position. The differential 108 therefore achieves all needed relative displacement between the top differential sprocket 110, the center differential sprocket 111, and the bottom differential sprocket 112, by movement of the top differential sprocket 110 as driven directly by the link 250, and by movement of the differential center plate 209, as driven by the link 250 through links 248, 244 and 240.

The Transmission Linkage

Referring now to FIGS. 7, 19 and 33–35, a transmission linkage 236 includes a linkage housing 290 bolted to the underside of the bottom plate 72. A fork shaft 292 extends through a bore in the link housing 290. Front and rear forks 294 and 302 respectively are attached to the ends of the fork shaft 292. Pins 296 extend inwardly from both arms of the forks 294 and pivotally engage grooved caps 298 which are attached to the lower pin plates 160 and 187 on the rear and front transmissions. The interconnection between the pins 296 and the grooved cap 298 accommodates the relative vertical and slight horizontal movement between them as the forks rotate up and down, and also allows for rotational movement of the cap 298 in the rear transmission 104, with steering movements. While the groove cap 298 on the rear transmission 104 rotates during steering, the groove cap 298 on the front transmission does not.

Referring to FIGS. 7 and 33–35, the rear fork 302 includes an arm 304 linked to a ball clevis 306. The ball clevis 306 is joined to the outer ends of a front link 308 and rear link 310. The inner end of the front link 308 is pivotably attached to a stand 312 fixed to the bottom plate 72 via housing 290. The inner end of the rear link 310 is pivotably attached to a driver link 314 pivotably attached to a base section 316 of the stand 312. A connecting link 318 is pivotably attached to the driver link 314, at the back end of the steering system 50 and to a lever 320, towards the front of the steering system. The lever 320 is (welded) fixed to the bottom end of the vertical shaft 231 on the links block 230.

As the rear fork 302 pivots up and down as the handle 52 is turned about axis B to shift steering modes, the arm 304 on the rear fork 302 drives the ball clevis 306 left to right, which causes the link 318 to move front to back in direction S. The link 318 in turn causes the links block 230 to pivot. The links 308 and 310 form an over-center linkage so that, as the handle 52 twisted from the up position (corrective steering), to the center position (for crab steering), to the down position (for round steering), the link 318 first drives the links block clockwise (as viewed from above), and then counterclockwise by a greater amount, as shown in FIGS. 39–41.

The Leg Position Compensator

Figure 46:
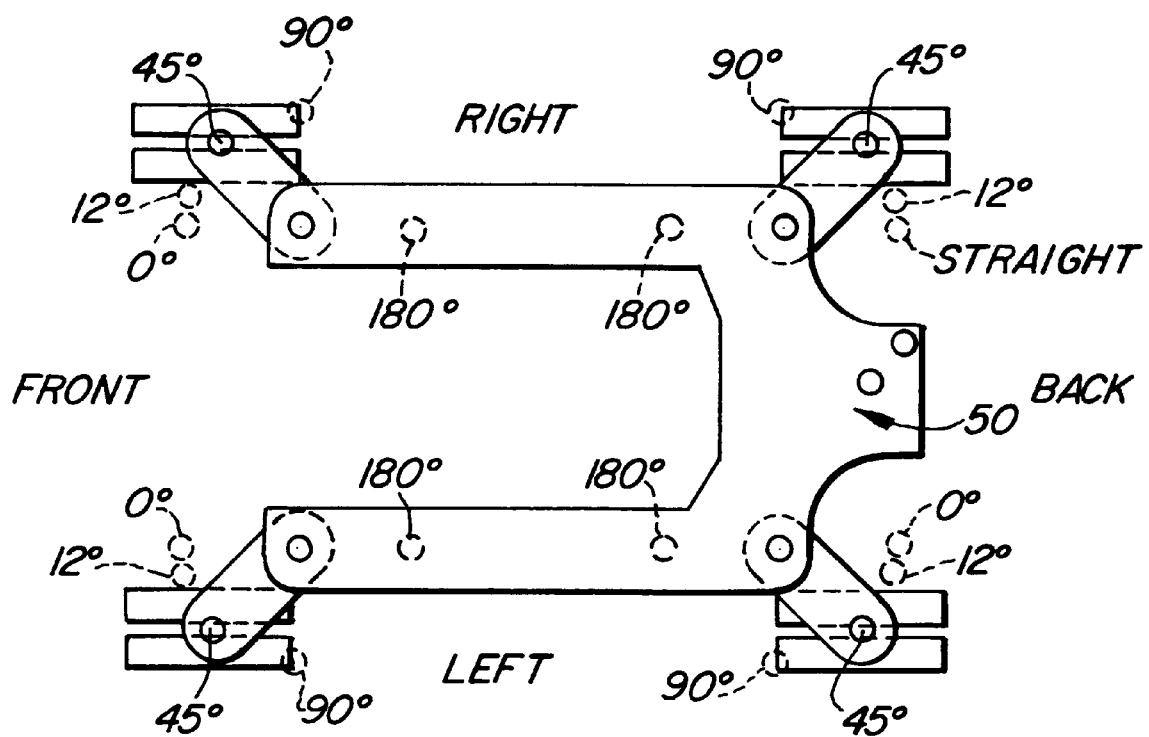
FIG. 46 is a schematic illustration showing alternate leg positions.

Camera dollies having articulated legs, such as the dolly 30 shown in FIG. 1, have preferred leg positions, for use in different applications. Referring to FIG. 46, these leg positions are:

| Position No. | Front Legs | Back Legs |
| --- | --- | --- |
| 1 | 0° | 0° |
| 2 | 12° | 12° |
| 3 | 33° | 33° |
| 4 | 45° | 45° |
| 5 | 90° | 0° |
| 6 | 180° | 0° |

Other combinations of leg positions can also be used. However, when using other combinations, steering correction may not be as accurate, especially at very sharp turning angles. Consequently, these are the preferred leg positions. Changing leg positions changes the track width and wheelbase of the dolly (i.e., the lateral and longitudinal spacing between the kingpins). Accordingly, since the dolly geometry is changed, the correction of steering angles must also be changed, to maintain perfect or near perfect steering. The dolly 30 therefore has a leg position compensator, described below, which compensates for changes between leg positions, to maintain near perfect steering geometry.

As best shown in FIG. 34A, the driver link 314 has a shift slot 334 on the top surface. The shift slot 334 curves on a radius equal to the length of the link 318, between its attachment points. The slot 334 has an inboard hole 336 and an outboard hole 338, at opposite ends of the slot 334. A tapered link pin 332 is attached, by a press fit and is then welded to the top surface of the back end of the link 318. The pin 332 extends downward to engage the hole 336 or 338.

The inboard hole 336 is used when the legs of the dolly are in the Position Nos. 1 and 2, as shown in FIG. 46. The outboard hole 338 is used for leg Position Nos. 4, 5 and 6 as also shown in FIG. 46. Leg position No. 3 (front and rear at 33°), if provided, would use an intermediate hole between holes 336 and 338. The 0°, 12° positions do not differ enough to require added correction.

To shift between the inboard and outboard holes (when the leg positions are changed), the handle 330 is lifted by about 0.2 inch to remove the pin 332 from the hole 336 or 338. This shifting of the handle is preferably done while in the crab steering mode, because the dolly legs are more easily moved when in crab (as the wheels on the leg can be steering to track the arc traced out by pivoting a leg), and because the slot 334 and pin 332 position are selected so that shifting the handle 330 when in crab mode does not require movement of any other components. The handle is moved laterally. As this occurs, the pin 332 slides in the slot 334 until it drops into the other hole. Due to the radius of the slot, this movement occurs without turning the links block 230 when in the crab position.

As shown in FIGS. 34A–D, the shift handle 330 is attached to the back end of the link 318. The front end of the link 318 is attached to a pivot block 340 via a pivot pin 345. The pivot block 340 is pivotably attached to the shift link 320. A spring 342 biases the link 318 and handle downwardly, which maintains the pin 332 in its selected position, until the handle 330 is deliberately lifted up and shifted to another position, to compensate for a change in leg position. A stop bolt 364, as shown in FIGS. 34C and 34D, limits the downward movement of the link 318, to prevent the pin 332 from engaging too tightly into holes 336 or 338, and making handle movement more difficult.

When the steering is shifted between modes, the over center linkage 300 drives the link 318 in or out in the direction S shown in FIGS. 34A, thereby pushing or pulling on the lever 320 and causing the links block 230 to pivot. This changes the offset provided by the differential. The offset compensates the steering apparatus for the change in the dolly wheel positions which occurs when the dolly legs are shifted to different positions.

Figure 47A:
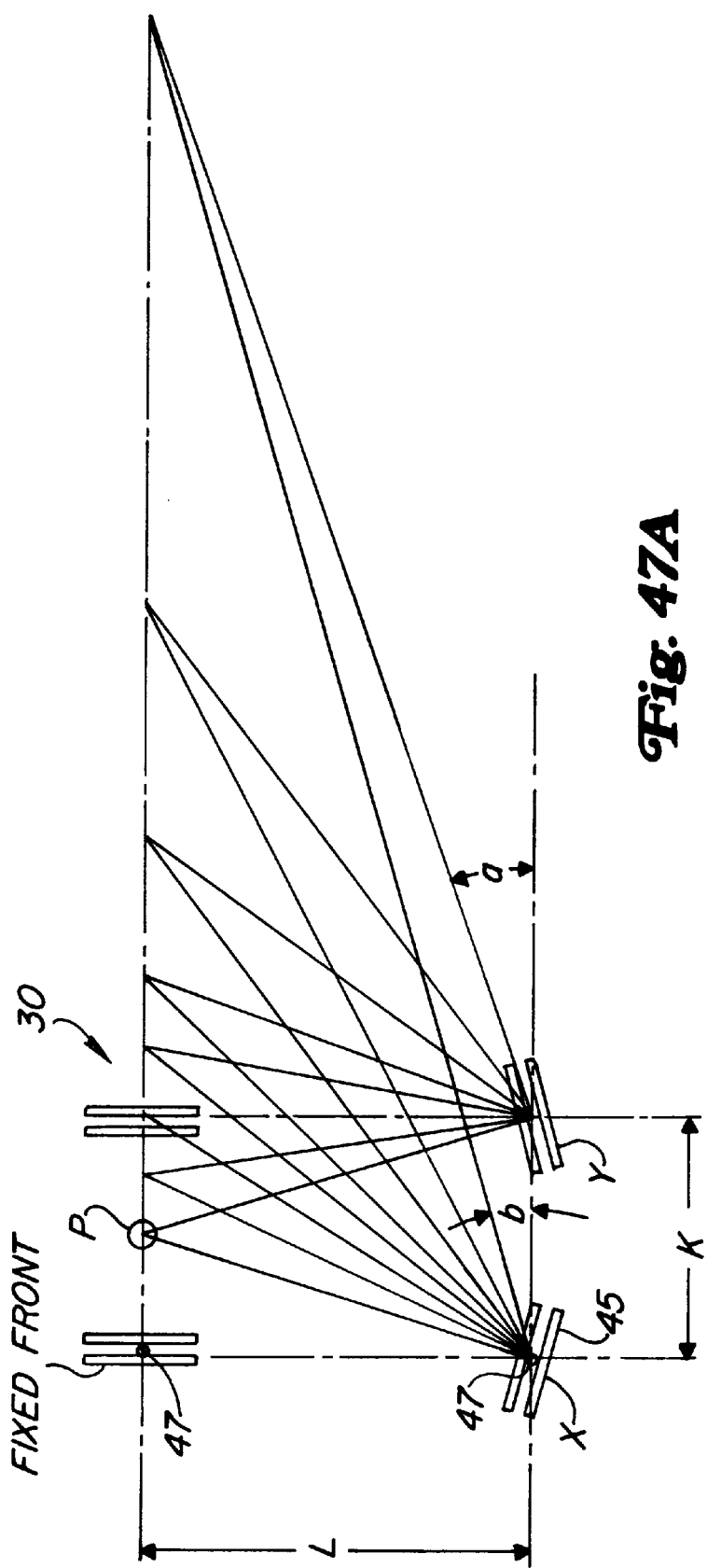
FIGS. 47A and B are geometric constructions illustrating principles of corrective or conventional and round steering.

As shown in FIGS. 47A and B, as the tread dimension (lateral wheelbase) of the dolly increases (to a wider tread, in the 45° leg position), more steering angle correction is needed. If the wheel or leg position of a dolly is fixed, the steering system can nearly perfectly match the steering correction angles needed (without compensation or adjustment of the linkages), as these angles do not change. On the other hand, with the dolly shown in FIG. 1, the leg positions can be changed, resulting in a different wheelbase and tread dimensions. The ability to slightly adjust the amount of movement in the differential generated during shifting, by using the handle 330 to compensate for different leg positions, allows the steering system to provide near perfect steering angle correction, for almost all dolly leg positions. If desired, additional intermediate holes may be provided in the slot 334 between holes 336 and 338, to compensate for intermediate leg positions.

The shifting and compensation provided by moving the leg position handle 330 is independent of the steering mode shifting provided by the handle bar 52. This ability to compensate for leg position is especially advantageous in round steering, where large amounts of steering angle correction are needed. While shifting between steering modes occurs frequently, changing leg positions is much less frequent. In camera dollies having a permanently fixed tread width, the leg position compensator is not needed and the steering system described above is simply used without it. It is, however, important to note that this adjustability allows the steering unit to be adaptable to most dolly designs.

The Shift Lock

As shown in FIGS. 27–29 and 36–38, the links block 230 preferably has an integral bottom sector plate 350. The sector plate includes an arc or angle of about 90°. The vertical curved surface of the sector plate 350 has 5 vertical slots or grooves 351, 352, 353, 354 and 355. A shift lock unit 370, which is used to prevent inadvertent movement of the links block 230, includes a housing 356 having a through bore 357. A plunger 360 extends through the bore 357. An end roller 358 on the plunger is biased into a constant engagement against the indent wheel 143, at the bottom of the rear transmission 104, via a compression spring 359. The forward end 362 of the plunger 360 is angled and adapted to securely fit into any one of the grooves 351–355. Ordinarily, the plunger is engaged into one of the grooves, thereby locking the links block 230 against any pivoting movement. The plunger 360 can only back out of a groove, and thereby unlock the links blocks 230 to allow it to pivot, when one of the two opposite indents on the indent wheel, comes into alignment with the end roller 358 (with every 180° turning movement of the steering handle).

The grooves 351, 353, and 355 are used respectively for round, conventional and crab steering, for leg position Nos. 4–6. The grooves 352 and 354 are used respectively for round and conventional steering, when the legs are in position Nos. 1 and 2. Position No. 3, if provided, would require two additional grooves on the sector plate 350.

The steering unit shown in FIGS. 39–41 is directly locked into a steering mode. This locking (of the links block 230) is preferred to avoid any slight changes in the differential offset during dolly maneuvers that result in high loads on the steering system. The locking is also fully automatic. The steering system unlocks only when all of the wheels are straight ahead (at 0° or 180°), a condition where high loads are not ordinarily encountered, and the required position for shifting the front and rear transmissions.

Dolly Operation

In use, the dolly 30 is ordinarily pushed from the back end with the user's hands on the handlebar 52. Turning the handlebar 52 about the axis A in FIG. 2 correspondingly turns the center sprocket 144 in the rear transmission 104, which is directly linked to the handle tube 56. The center sprocket 144 then drives the remaining components in the steering system. Ordinarily, the dolly will be in crab mode, as a "home" position, as crab mode allows the dolly to move in any direction, without angulating (i.e., changing the azimuth) of the camera lens. Shifting between conventional, crab and round steering mode is achieved by pivoting the handlebar 52 about the axis marked B in FIG. 2. With the handlebar 52 pivoted fully counterclockwise about axis B in FIG. 2, the rack bar 58 is pulled into the up position (for conventional steering) via the interaction of the pinion gear sector 54 on the rack teeth 60, as shown in FIG. 5.

Conventional Steering Mode

Figure 45:
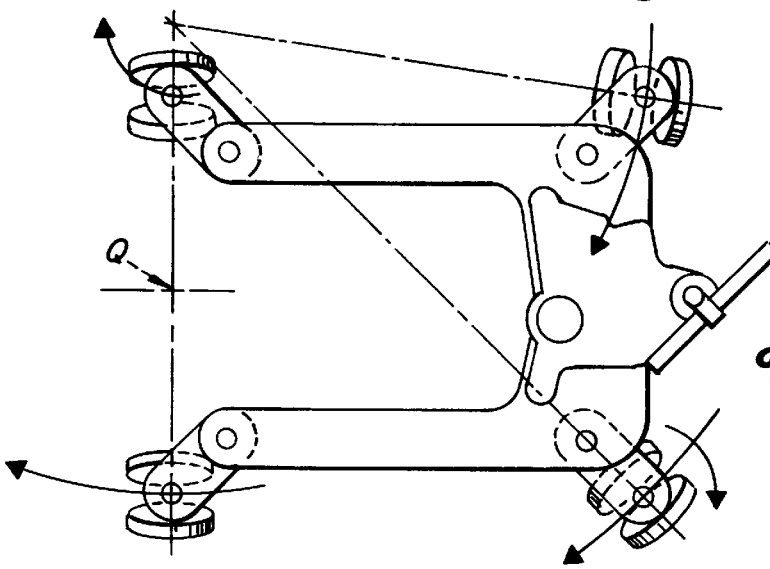
FIG. 45 is a schematically illustrated plan view of the dolly steering in conventional or corrective steering mode.

Dolly movement in conventional steering mode is shown in FIGS. 45 and 47A. Referring to FIG. 19 with the rackbar in the up position, the lower pin plate 160 in the rear transmission 104 is pulled into the up position. Consequently, the shift pins are aligned as shown in FIG. 19A. In this condition, none of the sprockets in the rear transmission 104 are engaged to each other. Consequently, as the handle 52 is turned, only the first center sprocket 144, the lower sprocket 149 and the indent wheel 143 (which is driven by sprocket 59 and chain 83) rotate, in the same direction as the handle 52). Referring to FIG. 9, as the first center sprocket 144 turns, it drives the differential center sprocket chain 81. This turns the right rear drive sprocket 57, causing the right rear wheels to turn the top differential sprocket 110 (which is offset from the center sprocket 111). The top sprocket 110 in turn drives the conventional chain 80 which turns to turning movement of the handlebar 52.

Referring still to FIG. 9, turning the middle sprocket 111 of the differential 108 drives the left conventional chain 92, causing the left rear drive sprocket 118 to turn in the same direction as the right rear drive sprocket 57. However, in the conventional steering mode, the top differential sprocket 110 is off-set from the bottom sprocket 112 by a predetermined amount. This causes the inside wheels to turn more sharply as the dolly is steered around a curve, as shown in FIG. 41. The difference in steering angle between the inside wheels and outside wheels is set by the differential so that the dolly 30 achieves near perfect geometrical steering, graphically shown in Fig. A. As a result, the dolly rolls silently and easily over the ground.

With constant speed turning of the handlebar 52, the bottom differential sprocket 112 speeds up and slows down (depending on the steering angle) via the off-set of the differential sprockets 110, 111, and 112, to provide the different steering angles to the rear wheels necessary for conventional steering. The difference in the desired steering angle between the inside and outside rear wheels of the dolly will vary with the dolly wheel base and tread dimensions. For the dolly shown in FIG. 41, having a lateral wheel tread of 24½ inches (in leg position No. 1 or 2) and a wheelbase of about 35 inches, the preferred off-set between the top and bottom sprockets of the differential for the dolly shown is about 0.78 inches. By comparison, for leg position No. 3, a selected offset of about 0.67 inches is used.

When in the conventional steering mode, the front wheels of the dolly must be locked into the straight ahead position. Referring to FIG. 19A, with the rackbar in the conventional (up) position, the shift pins in the rear transmission 104 lock the top sprocket 142 to the transmission housing. Referring to FIG. 9, consequently, the right crab chain 88 is locked in position, preventing any rotation movement of the rear transmission distributor 116. This in turn, locks the front right chain 94 against movement, thereby locking the front right wheels into the straight ahead position.

The shift pins in the front transmission 102 operate in a similar manner, and are shifted together and simultaneously with the shift pins in the rear transmission 104. As a result, the center sprocket 174 in the front transmission is not engaged with either the upper sprocket 172 or lower sprocket 176 in the front transmission 102. The center sprocket 174 can therefore turn freely with the axle 178, when in the conventional steering mode.

Referring to FIGS. 9 and 19A, the upper sprocket 172 of the front transmission 102 is locked against rotation by the shift pins engaging the upper sprocket 172 to the upper front transmission housing 106 that is bolted to the top plate 70 (similar to the locking of the top sprocket 142 in the rear transmission 104. Referring to FIG. 9, with the top sprocket 172 locked against rotation, the front transmission distributor 115 is similarly locked against rotation by the connection of the upper sprocket 172 on the front transmission 102, to the upper sprocket 190 on the front transmission distributor 115, by the left crab chain 86. As a result, the front left chain 90, which wraps around the center sprocket 192 on the front transmission distributor 115, cannot move.

Therefore, the front left wheel drive sprocket 126 is also locked against rotation in the straight ahead position. Hence, in conventional steering mode, the only chains that move and participate in steering are the right conventional chain 80, the left conventional chain 92, and the differential center sprocket chain 81. The right rear chain 83 also moves (but does not participate, except to allow shift lock 370 to actuate) during conventional steering, because sprocket 59 is locked up with sprocket 57, while sprocket 149 in the rear transmission, which is integral with the indent wheel 143, spins freely. The indent wheel 143 always rotates with sprocket 149, in all steering modes. The front wheels are locked straight ahead in conventional steering mode by the chains 90 and 94 and by the orientation of the pins in the transmission housings. This straight ahead front wheel position is adjusted during assembly of the dolly.

The steering unit is balanced in the sense that the force on the T-handle necessary to steer the dolly is the same whether turning to the left or to the right. This advantage becomes especially important when the dolly is heavily loaded (for example, with a camera operator, and a director of photography, as well as the camera, batteries, and accessories) and the steering forces needed become larger.

Crab Steering Mode

Figure 44:
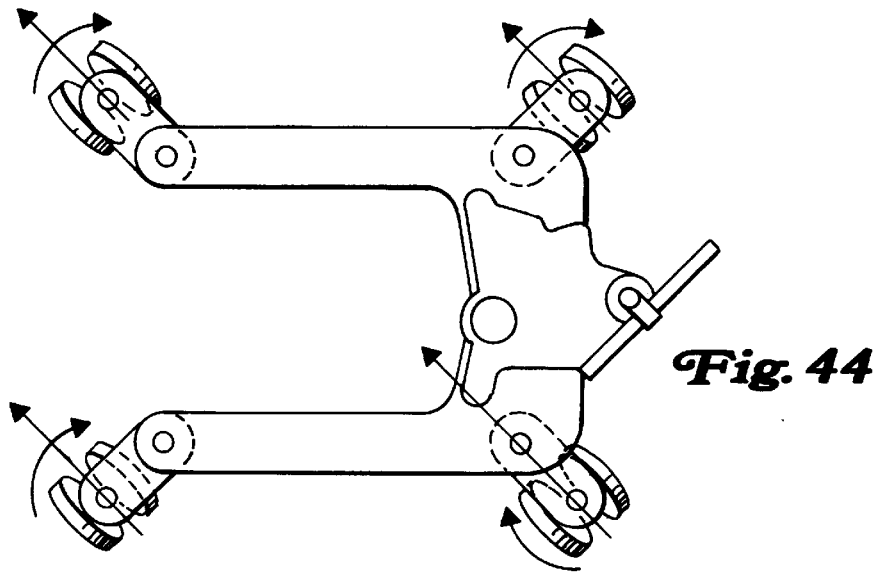
FIG. 44 is a schematically illustrated plan view of the dolly steering in crab mode.

Dolly movement in crab steering mode is shown in FIG. 44. To shift from the conventional steering mode to the crab steering mode (or between any steering modes), the handle bar must be at 0° or 180°, causing the plunger 360 of the shift lock 370 to be withdrawn from the notch (351–355) in the links block 230, as shown in FIG. 27. The links block 230 is then free to pivot. Also, the pins in the transmissions can only move when the transmission sprockets are at 0° or 180°.

The handlebar 52 is turned to 0° or 180° and is then pivoted about the B axis as shown in FIG. 2. As the handlebar 52 is pivoted into the crab position, an optional ball detent 380 (shown in FIG. 5) engages the handle housing 55 providing a tactile indication that the steering system is in the crab mode. Alternatively, the user can easily determine that the steering system has been shifted into crab mode via alignment markings on the handle 52 and handle housing 55, or by the feel of the handle movement. The rackbar 58 is pushed downwardly by the interaction of the rack teeth 60 and the pinion gear sector 54, shown in FIG. 5. Referring to FIG. 19A, this downward movement of the rackbar 58 in turn moves the lower pin plate 160 and the upper pin plate 168 down one position. As this occurs, the shift pins in the rear transmission 104 cause the top sprocket 142 to engage the first middle sprocket 144, such that sprockets 142 and 144 necessarily turn together. At the same time, the fork shaft 292 causes a similar shift in the front transmission 102, with the result that in the front transmission the upper sprocket 172 is locked together with the center sprocket 174 by the shift pins in the front transmission.

Figure 33:
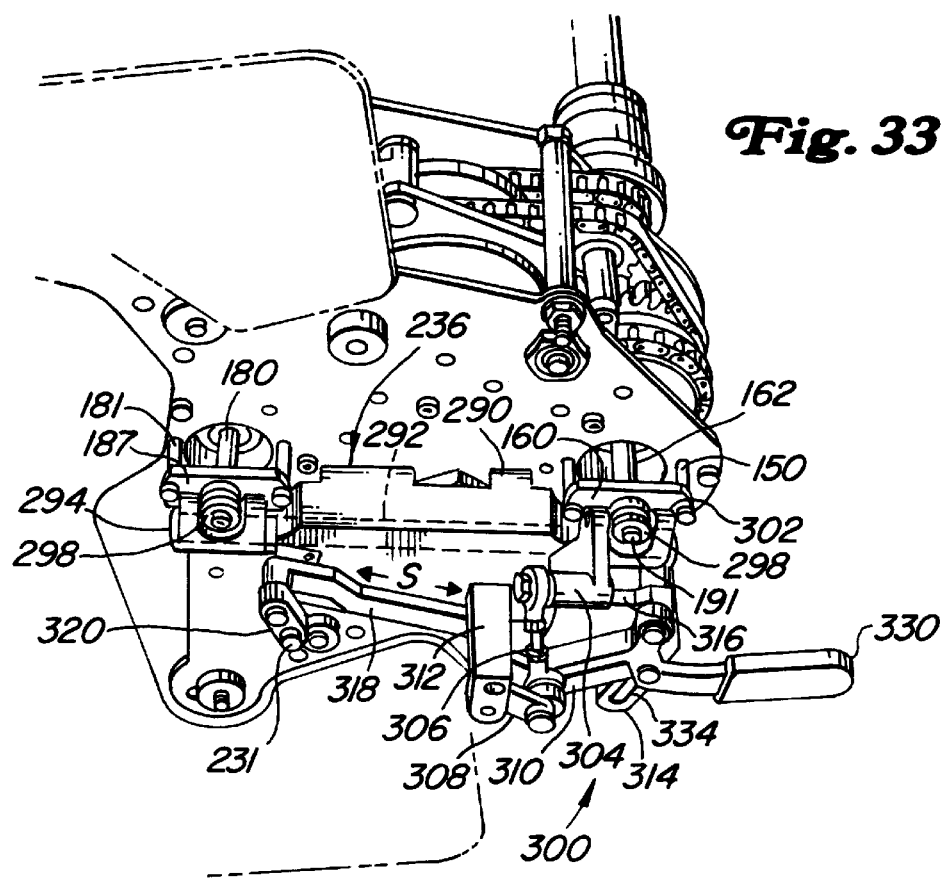
FIG. 33 is a bottom perspective view of the steering system shown in FIG. 2.

Referring to FIG. 33, as the rear fork 302 is pushed downwardly by the pin plate rod 162 in the rear transmission 104, the rear fork 302 drives the transmission linkage 236 which includes the fork shaft 292 and the front fork 294. In addition, this movement of the rear fork 302 during shifting from the conventional to crab mode (via turning the handlebar 52) also simultaneously causes the arm 304 on the rear fork 302 to drive the ball clevis 306. This in turn drives the rear link 310, and in turn the shift link 318 and lever 320, causing the links block 230 to rotate by a predetermined amount, as shown in FIG. 34.

Referring to FIG. 7, 10 and 39, this movement of the links block 230 causes the top differential sprocket link 250 to shift in a direction towards aligning the top sprocket 110, the middle sprocket 111, and the bottom sprocket 112 of the differential. Simultaneously, the other four links attached to the links block 230 move the active idlers 99, 76, 77 and 75. The center differential plate 209 also moves along with the parallelogram-like links 240, 244 and 248 and 245 on the opposite side of the differential. This shifting causes the top differential sprocket 110, the middle differential sprocket 111 and the bottom differential sprocket 112 to align with each other (and correspondingly, the plates 205, 209 and 207 are also aligned). The differential 108 then no longer provides any steering angle correction or difference between the left and right rear wheels. Rather, in the crab mode, the differential 108 acts likes a simple distributor, i.e., with the top, middle and bottom sprockets aligned on a common shaft.

During this shifting motion, the rollers 218 roll in the slots 210 in the top and bottom differential plates 205 and 207. The rollers 218 transmit torque between the top and bottom sprockets of the differential 108, yet allow those sprockets to be off-set from each other, in conventional and round steering modes.

Referring to FIGS. 9 and 19A, with the steering system 50 shifted into the crab steering mode, movement of the handle tube 56 turns both the top sprocket 142 and first center sprocket 144 in the rear transmission. As a result, the right crab chain 88 passing around the top sprocket 142 drives the top sprocket 120 on the rear transmission distributor 116. This causes the entire rear transmission distributor 116 to turn, including the center sprocket 122 and lower sprocket 124 on the rear transmission distributor 116. The turning movement of the lower sprocket 124 drives the front right chain 94, causing the front right drive sprocket 128 and the front right wheels to turn with the handle tube 56. The center sprocket 122 on the rear transmission distributor 116 also turns, driving the round drive chain 82 around the fixed idlers 96 and 98, and around the free spinning lower center sprocket 146 on the rear transmissions 104. This movement does not participate in any steering, in the crab mode.

Referring still to FIG. 9, with the steering system 50 in the crab steering mode, the upper center sprocket 144 on the rear transmission 104 also turns with turning movement of the steering tube 56. This movement drives the differential center sprocket chain 81, thereby driving the right conventional chain 80 through the top differential sprocket 110 (in the same direction and speed as the chain 81). The chain 80 then turns the right rear drive sprocket 57 and the right rear wheels of the dolly 30, in the same direction, and by the same amount as the front right wheels. The chain 81 also drives the now aligned lower differential sprocket 112. The bottom differential sprocket 112 then drives the left conventional chain 92, turning the left rear wheel sprocket 118, and therefore the left rear wheels.

Referring still to FIG. 9, the movement of the left conventional chain 92 also turns the center sprocket 174 on the front transmission 102. As the center sprocket 174 is locked into engagement with the top sprocket 172 in the front transmission 102 by the shift pins, the right crab chain 86 correspondingly drives the entire front transmission distributor 115. The center sprocket 192 on the front transmission distributor 115 drives the front left chain 90, turning the left front drive sprocket 126, and the front left wheels.

Thus, when in crab mode, all of the wheels turn in the same direction, and by the same amount, with turning of the T-handle. The turning movement of the front transmission distributor 115 also drives the round left chain 84. However, the chain 84 does not participate in steering in the crab steering mode, as sprocket 176 is free turning in the crab mode.

The diameters of the various sprockets in the steering system 50 are selected to provide a 1:1 ratio between turning movement of the handle tube 56 and the turning movement of the wheels, in the crab mode. Accordingly, as described above, in the crab steering mode, all of the wheels of the dolly are steered in the same direction and by the same amount, as shown in FIG. 44.

Round Steering Mode

Figure 43:
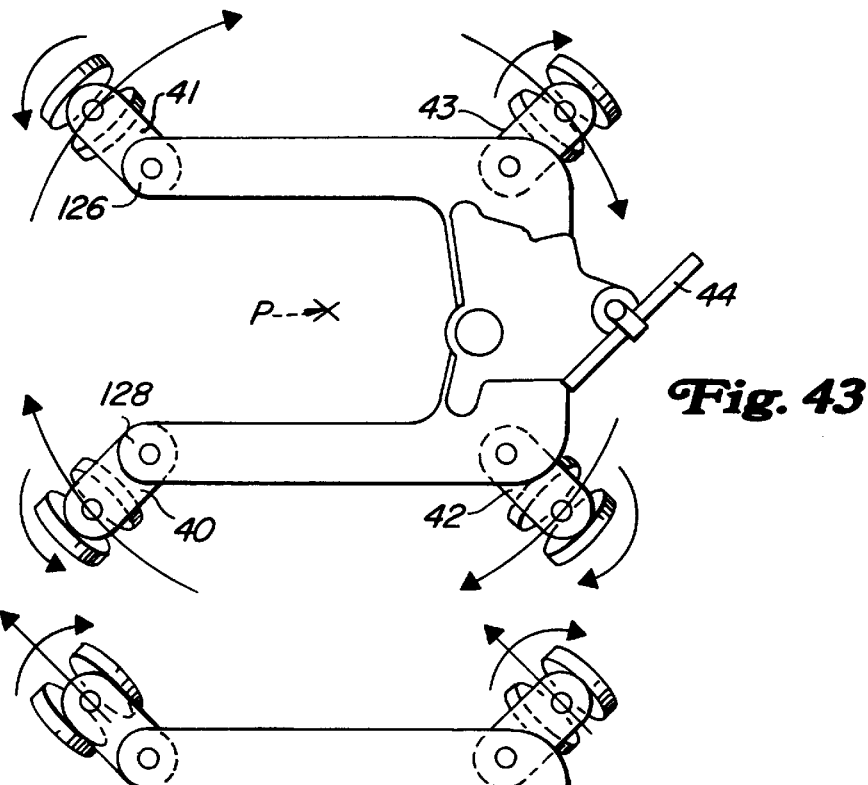
FIG. 43 is a schematically illustrated plan view showing the dolly steering in round steering mode.

Dolly movement in round steering mode is shown in FIGS. 43 and 47B. To shift from the crab steering mode to the round steering mode, the handlebar 52 is rotated about the B axis to a third (down) position. As shown in FIG. 5, this movement of the handlebar 52 further drives the rackbar 58 downwardly. As a result, the upper pin plate 168 and the lower pin plate 160 in the rear transmission 104 are moved down into their lowest operating position (for round steering). The shift pins are also pushed down, by the upper pin plate locking the lower sprocket 146 to the bottom sprocket 144 in the rear transmission 104. At the same time, upper pin plate 189 and the lower pin plate 187 in the front transmission 102 also move downwardly, and cause the shift pins in the front transmission 102 to lock the lower sprocket 176 to the center sprocket 174.

Referring to FIGS. 7, 19 and 33–35, the downward shift of the rackbar 58 drives the pin plate rod 162 to its lowest position. At the same time, the rear fork 302 is pivoted further downwardly causing the arm 304 to drive the over center linkage 300 into the round steering position. With this movement, the rear link 310 in the over center linkage 300 moves through a center position, pulling the connecting link 318 forwardly. As a result, the links block 230 pivots (in the direction substantially opposite to the turning movement when shifting from conventional to crab steering). Referring to FIG. 7, as the links block 230 pivots (clockwise, when viewed from above), the top step link 250 moves the top differential sprocket 110 away from the bottom differential sprocket 112. Simultaneously, the links 250, 248, 244, 240, and 245 move the center differential plate 209 off center from the bottom differential sprocket 112, to the positions shown in FIGS. 7 and 41. This is the maximum off-set position of the differential 108.

The amount of offset in the differential 108 for round steering is double the off-set for conventional steering. As the top differential sprocket 110 moves off-center, the tension in the right conventional chain 80 must be maintained. This is achieved via the active idlers 76 and 99. As shown in FIG. 9, the active or moving idlers 76 and 99 both engage the right conventional chain 80 on opposite sides of the top differential sprocket 110. During movement of the links block 230 into the round steering mode, the short link 280, which controls the position of the active idler 76, and the to link 260, which controls the position of the active idler 99, both shift to maintain appropriate tension on chain 80. The active idlers also perform this function when shifting between conventional and crab steering.

Referring once again to FIG. 9, with the first or upper center sprocket 144 locked together for rotation with the bottom sprocket 149 of the rear transmission 104, turning movement of the handle tube 56 drives the differential center sprocket chain 81, thereby turning all of the differential sprockets (by different amounts due to the sprocket offsets). The top sprocket 110 drives the right conventional chain 80, steering the right rear wheels. The lower differential sprocket 112, which is now off-set from the upper differential sprocket 110 by a maximum off-set distance also turns, driven by chain 81 and by the rollers 218 driving the plates 205, 207. The off-set amount is sufficiently large enough to drive the left rear wheels to a steering angle, relative to the right rear wheels, such that the rotation axes of the left and right rear wheels intersect at a point along the center axis of the dolly 30, as is necessary for round steering. This off set in steering angles between the rear wheels is achieved via the differential 108, with the chains 80 and 92 and sprockets 57 and 118 turning in the same direction. Due to the offset, the chains controlling the wheels steering angle speed up and slow down, in a sine function, relative to the turning of the T-bar, so that each wheel is turned to the correct angle.

Referring still to FIG. 9, as the lower center sprocket 146 of the rear transmission 104 turns, the outside or rear surface of the round drive chain 82 turns the rear transmission distributor 116 in a direction opposite to the turning direction of sprocket 146. The lower sprocket 124 on the rear transmission distributor 116 consequently drives the front right chain 94 and sprocket 128 in a direction, and to a steering angle, equal to and opposite from the right rear drive sprocket 57. The lower differential sprocket 112 drives the left conventional chain 92, thereby turning the center sprocket 174 in the front transmission 102. The center sprocket 174 is secured to and turns the lower sprocket 176 of the front transmission, driving the left round chain 84. As the lower sprocket 194 on the front transmission distributor 115 engages the outside or back surface of the round left chain 84, the entire front transmission distributor 115 is turned in a direction opposite to the direction of rotation of the center and lower sprockets 174 and 176 of the front transmission 102. As a result, the front left chain 90 turns the front left wheel drive sprocket 126 in a direction opposite to the turning movement of the left rear wheel sprocket 118. Consequently, the front left and rear left wheels of the dolly are steered in equal and opposite directions, such that their axes of rotation also intersect the axes of rotation of the rear right and front right wheels, at a single point P, as shown in FIG. 43. In this round steering mode, the dolly can turn about the center of its wheelbase, allowing for minimum turning radius and greater maneuverability.

As shown in the drawings, some of the chains wrap around a sprocket for only a short distance, providing only a minimal engagement between the sprocket teeth and chain links. To prevent the chain from inadvertently skipping over sprocket teeth, during high torque maneuvers, chain guards are preferably provided. Referring to FIG. 11A, a first chain guard 322 is attached to the bottom surface of the sprocket link 250. The inside surface of the first chain guard 322 is contoured to match the curvature of the upper differential sprocket 110 with the left conventional chain 80 wrapped around it. The chain guard 322 is positioned sufficiently close to the chain 80 to prevent it from rising up and skipping over teeth on the sprocket 110. Second and third chain guards 324 and 326, as shown in FIGS. 12 and 13, are similarly provided to prevent skipping of the round left chain 84 over the sprocket 194 on the front transmission distributor 115, and to prevent the round drive chain 82 from skipping over the teeth on the sprocket 122 of the rear transmission distributor 116. A rear transmission chain guard 390 may also be provided, as shown in FIG. 2.

During initial alignment of the steering system, the alignment pin 213 is placed through a hole in the top plate 70 and through the alignment holes 212 in the differential 108, as shown in FIG. 21, with the steering system in the crab mode. If necessary, the top, middle and bottom differential sprockets, and all of the sprockets on both distributors, can also be adjusted (i.e., turned in either direction and then locked in place). The chains of the steering system are then adjusted using the various fixed idlers. The steering system is then ready for installation into a dolly.

Thus, a novel camera dolly has been shown and described. Various modifications and substitutions of known equivalents may of course be made, without departing from the spirit and scope of the invention. For example, belts or gears may be substituted for chains, pulleys and gears may be substituted for sprockets, and the components and functions of various elements of the steering unit may be combined in ways different from those shown and described. The invention, therefore, should not be limited, except by the following claims and by equivalents to the claims.

What is claimed is:

1. A steering unit for a camera dolly having wheels, comprising:
   a steering transmission;
   a differential;
   sprockets on the steering transmission, and on the differential;
   chains at least indirectly connecting the steering transmission to the differential, the sprockets and chains forming a corrective steering system, a crab steering system, and a round steering system; and
   a steering/shift handle linked to the steering transmission, for both steering the wheels of the dolly, and for shifting between the corrective, crab and round steering systems.

2. The steering unit of claim 1 wherein the differential comprises a top sprocket, a center sprocket, and a bottom sprocket, with the top sprocket axially displaceable from the center sprocket and the bottom sprocket, to provide corrective and round steering.

3. The steering unit of claim 2 further comprising means for automatically and simultaneously adjusting tension on the chains connecting to the top and center sprockets of the differential, when the steering unit is shifted between steering modes.

4. The steering unit of claim 2 further comprising:
   a steering unit housing supporting the differential and steering transmissions;
   a links block pivotably supported on the steering unit housing; and
   a first link pivotably attached to the links block and to the top sprocket of the differential.

5. The steering unit of claim 4 further comprising second, third, fourth, and fifth links pivotably attached to the links block and to first, second, third, and fourth active idler sprockets, with the first and second active idler sprockets engaging the chain connecting to the top sprocket on the differential and the third and fourth active idler sprockets engaging the chain connecting to the middle differential sprocket.

6. The steering unit of claim 1 wherein the steering transmission comprises a first transmission spaced apart from a second transmission, and with the differential connected to the first transmission by a differential/first transmission chain and the differential connected to the second transmission by a differential/second transmission chain.

7. The steering unit of claim 6 wherein the sprockets on the first and second transmissions are stacked up vertically and within each transmission have a single axis of rotation.

8. The steering unit of claim 1 further comprising a first distributor connected to the first transmission by a first distributor/transmission chain, and also connected to a first wheel on the camera dolly by a first wheel chain and a second distributor connected to the second transmission by a second distributor/transmission chain, and also connected to a second wheel on the camera dolly by a second wheel chain.

9. The steering unit of claim 1 further comprising a pivotable links block having a first link connecting to the differential and having a plurality of idler links connecting to active idlers engaging chains extending around sprockets on the differential.

10. The steering unit of claim 1 further comprising an over-center linkage attached to the links block and to the steering/shift handle.

11. The steering unit of claim 1 wherein the steering transmission and the differential are supported between top and bottom steering unit plates, so that the steering unit can be installed in and removed from a camera dolly as a unit.

12. The steering unit of claim 1 further comprising a mechanical linkage from the shift handle to the transmission and differential.

13. A steering system for a camera dolly comprising:
   a rear transmission having first, second, third, and fourth sprockets supported on a first axle;

a front transmission having a first, second and third sprockets supported on a shift rod;

a differential having a top, center and bottom sprockets axially displaceable from each other;

a rear transmission distributor and a front transmission distributor, each having top, center and bottom sprockets;

a first chain connecting the top sprocket of the rear transmission to the top sprocket of the rear transmission distributor;

a second chain connecting the second sprocket of the rear transmission to the center sprocket of the differential;

a third chain connecting the third sprocket on the rear transmission to the center sprocket on the rear transmission distributor;

a fourth chain connecting the fourth sprocket on the rear transmission to a lower axle sprocket on an axle;

a fifth chain connecting the top sprocket of the differential to an upper axle sprocket on the axle;

a sixth chain connecting the lower sprocket on the differential to the middle sprocket on the front distributor;

a seventh chain connecting the top sprocket on the front transmission to the top sprocket on the front transmission distributor; and an eight chain connecting the lower sprocket on the front transmission distributor to the lower sprocket on the front transmission.

14. A method of steering a camera dolly comprising the steps of:

placing the dolly operators hands on a steering bar on the dolly;

selecting conventional steering mode by turning the steering bar, with the operator's hands continuously remaining on the steering bar;

selecting crab steering mode by turning the steering bar, with the operator's hands continuously remaining on the steering bar;

selecting round steering mode by turning the steering bar, with the operator's hands continuously remaining on the steering bar; and locking the differential sprockets into fixed positions whenever the steering bar is not positioned at 0 degrees or 180 degrees.

15. The method of claim 14 further comprising the step of moving sprockets on a differential apart as the camera dolly is shifted into conventional or round steering.

16. The method of claim 14 further comprising the step of moving active idlers while shifting steering modes to maintain tension on chains within the dolly.

17. A method of steering a camera dolly comprising the steps of:

placing the dolly operators hands on a steering bar on the dolly;

selecting conventional steering mode by turning the steering bar, with the operator's hands continuously remaining on the steering bar;

selecting crab steering mode by turning the steering bar, with the operator's hands continuously remaining on the steering bar;

selecting round steering mode by turning the steering bar, with the operator's hands continuously remaining on the steering bar; and adjusting the amount of movement of the differential sprockets to compensate for a change in the dolly wheelbase/tread dimensions.

* * * * *